US012812092B2

(12) United States Patent
Sarwer et al.

(10) Patent No.: US 12,812,092 B2
(45) **Date of Patent: *Nov. 24, 2026**

(54) WARPED REFERENCE LIST FOR WARPED MOTION VIDEO CODING

(71) Applicant: GOOGLE LLC, Mountain View, CA (US)

(72) Inventors: Mohammed Golam Sarwer, San Jose, CA (US); Rachel Barker, Cambridge (GB); Jianle Chen, San Diego, CA (US); Debargha Mukherjee, Cupertino, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/064,981

(22) Filed: Feb. 27, 2025

(65) Prior Publication Data

US 2025/0227224 A1 Jul. 10, 2025

Related U.S. Application Data

(63) Continuation of application No. 18/074,562, filed on Dec. 5, 2022, now Pat. No. 12,267,484.

(51) Int. Cl.

| | |
|---|---|
| ***H04N 19/105*** | (2014.01) |
| ***H04N 19/176*** | (2014.01) |
| ***H04N 19/182*** | (2014.01) |
| ***H04N 19/46*** | (2014.01) |

(52) U.S. Cl.

CPC ......... *H04N 19/105* (2014.11); *H04N 19/176* (2014.11); *H04N 19/182* (2014.11); *H04N 19/46* (2014.11)

(58) Field of Classification Search

None

See application file for complete search history.

(56) References Cited

U.S. PATENT DOCUMENTS

| | | | | |
|---|---|---|---|---|
| 10,089,713 | B2 * | 10/2018 | Fletcher .................. | G06T 3/153 |
| 10,110,914 | B1 | 10/2018 | Chen et al. | |
| 10,225,573 | B1 | 3/2019 | Mukherjee et al. | |
| 10,582,212 | B2 | 3/2020 | Mukherjee et al. | |
| 10,659,788 | B2 | 5/2020 | Xu et al. | |
| 10,701,390 | B2 * | 6/2020 | Li .......................... | H04N 19/54 |
| 10,931,956 | B2 | 2/2021 | Liu et al. | |

(Continued)

*Primary Examiner* — Mohammad J Rahman
(74) *Attorney, Agent, or Firm* — Adam D. Kline

(57) ABSTRACT

Encoding and decoding using warped reference list includes generating a reconstructed frame from an encoded bitstream by, for decoding a current block for the reconstructed frame, obtaining a dynamic reference list, obtaining a warped reference list, decoding a warped reference list index value, obtaining optimal predicted warped model parameters from the warped reference list in accordance with the index value, decoding differential warped model parameters, obtaining, as optimal warped model parameters, a result of adding the optimal predicted warped model parameters and the differential warped model parameters, obtaining predicted block data in accordance with the optimal warped model parameters, decoding residual block data, and obtaining, as decoded block data for the current block, a result of adding the residual block data and the predicted block data.

20 Claims, 15 Drawing Sheets

(56) References Cited

U.S. PATENT DOCUMENTS

| | | | | |
|---|---|---|---|---|
| 11,379,948 | B2 * | 7/2022 | Nourai | G06T 17/20 |
| 11,412,233 | B2 | 8/2022 | Liu et al. | |
| 11,790,482 | B2 * | 10/2023 | Nourai | G06T 19/006 345/646 |
| 2010/0215101 | A1 * | 8/2010 | Jeon | H04N 19/583 375/E7.243 |
| 2011/0142138 | A1 * | 6/2011 | Tian | H04N 19/597 375/E7.026 |
| 2012/0044322 | A1 * | 2/2012 | Tian | H04N 19/70 348/E13.001 |
| 2016/0277762 | A1 * | 9/2016 | Zhang | H04N 19/593 |
| 2018/0330717 | A1 * | 11/2018 | Jin | G10L 15/12 |
| 2019/0110063 | A1 | 4/2019 | Mukherjee et al. | |
| 2019/0124361 | A1 * | 4/2019 | Zhao | H04N 13/161 |
| 2019/0158843 | A1 | 5/2019 | Xu et al. | |
| 2019/0289329 | A1 * | 9/2019 | Zhao | H04N 19/82 |
| 2019/0320186 | A1 | 10/2019 | Liu et al. | |
| 2020/0027194 | A1 * | 1/2020 | Nourai | G06F 3/017 |
| 2021/0021810 | A1 * | 1/2021 | Kang | H04N 19/105 |
| 2021/0195217 | A1 | 6/2021 | Liu et al. | |
| 2022/0245758 | A1 * | 8/2022 | Nourai | G06F 3/013 |
| 2023/0328226 | A1 | 10/2023 | Li et al. | |
| 2023/0412794 | A1 * | 12/2023 | Li | H04N 19/52 |

* cited by examiner

WARPED REFERENCE LIST FOR WARPED MOTION VIDEO CODING

CROSS-REFERENCE TO RELATED APPLICATION(S)

This application is a continuation of U.S. application patent Ser. No. 18/074,562, filed Dec. 5, 2022, the entire disclosure of which is hereby incorporated by reference.

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both for transmission, storage, or both. Disclosed herein are aspects of systems, methods, and apparatuses for encoding and decoding using warped reference list for warped motion video coding.

Variations in these and other aspects will be described in additional detail hereafter.

An aspect is a method for encoding using warped reference list for warped motion video coding. Encoding using warped reference list for warped motion video coding includes obtaining a translational dynamic reference list for encoding a current block from a current frame from an input video, and obtaining a warped reference list for encoding the current block, obtaining an output bitstream including an index value corresponding to optimal predicted warped model parameters from the warped reference list, encoded block data obtained by encoding the current block using optimal warped model parameters, and differential warped model parameters, wherein the differential warped model parameters indicate a difference between the optimal warped model parameters and the optimal predicted warped model parameters. Encoding using warped reference list for warped motion video coding includes outputting the output bitstream.

Another aspect is a method for decoding using warped reference list for warped motion video coding. Decoding using warped reference list for warped motion video coding includes obtaining an encoded bitstream, generating a reconstructed frame, and outputting the reconstructed frame. Generating the reconstructed frame includes obtaining a translational dynamic reference list for decoding a current block for the reconstructed frame, obtaining a warped reference list for decoding the current block, decoding a warped reference list index value from the encoded bitstream, obtaining optimal predicted warped model parameters from the warped reference list in accordance with the index value, decoding differential warped model parameters for the current block from the encoded bitstream, obtaining, as optimal warped model parameters for the current block, a result of adding the optimal predicted warped model parameters and the differential warped model parameters, obtaining predicted block data for the current block in accordance with the optimal warped model parameters, decoding residual block data for the current block from the encoded bitstream, obtaining, as decoded block data for the current block, a result of adding the residual block data and the predicted block data, and including the decoded block data in a reconstructed block of the reconstructed frame.

Another aspect is an apparatus for decoding using warped reference list for warped motion video coding, the apparatus comprising a memory including computer executable instructions for decoding an encoded video stream, and a processor that executes the instructions to obtain the encoded video stream, generate a reconstructed frame, and output the reconstructed frame. To generate the reconstructed frame the processor executes the instructions to obtain a translational dynamic reference list for decoding a current block for the reconstructed frame, obtain a warped reference list for decoding the current block, decode a warped reference list index value from the encoded video stream, obtain optimal predicted warped model parameters from the warped reference list in accordance with the index value, decode differential warped model parameters for the current block from the encoded video stream, obtain, as optimal warped model parameters for the current block, a result of adding the optimal predicted warped model parameters and the differential warped model parameters, obtain predicted block data for the current block in accordance with the optimal warped model parameters, decode residual block data for the current block from the encoded video stream, obtain, as decoded block data for the current block, a result of adding the residual block data and the predicted block data, and include the decoded block data in a reconstructed block of the reconstructed frame.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
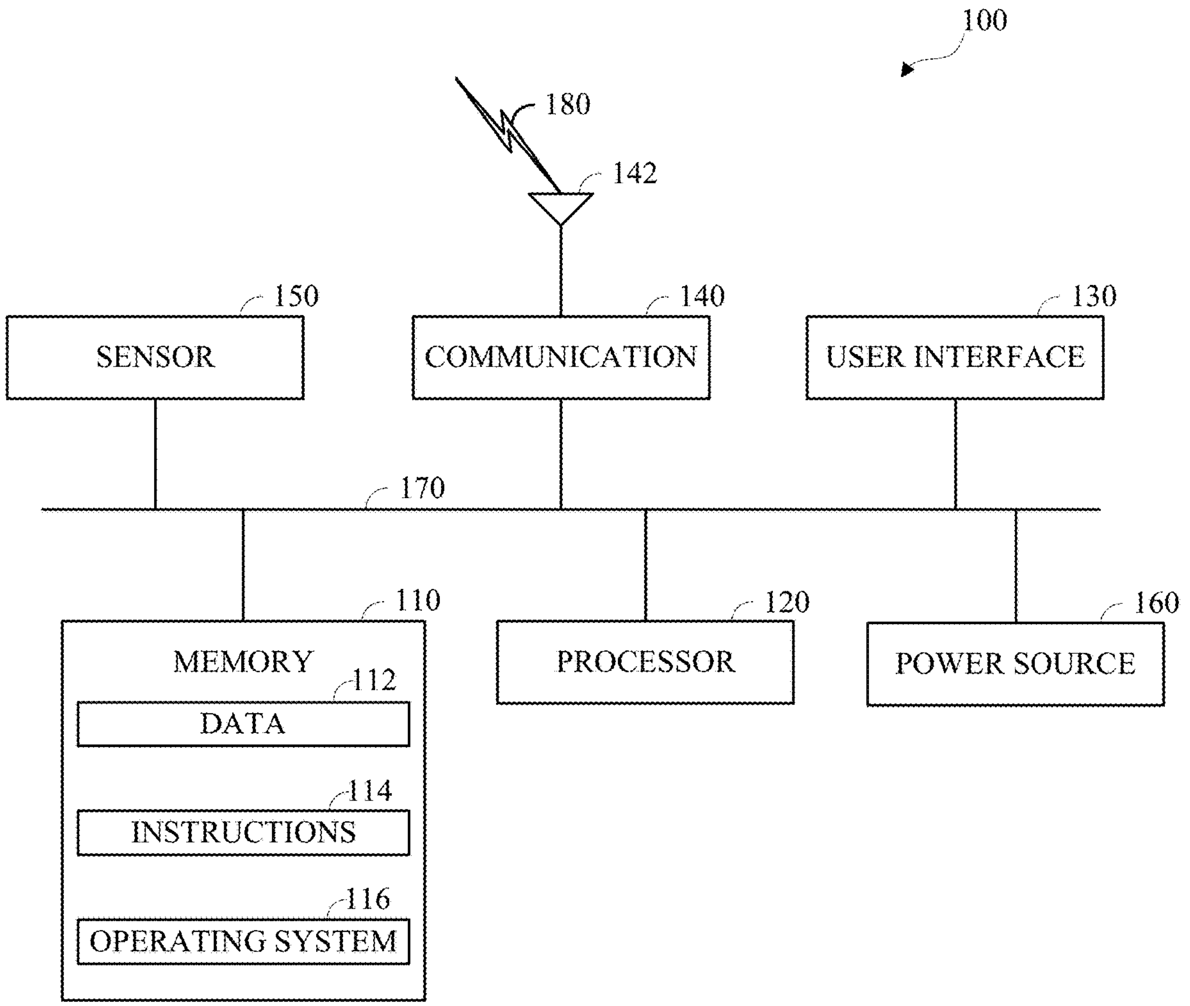
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Some block-based hybrid video coding techniques, or codecs, may be limited to reducing temporal redundancy using a translational motion model, which may inefficiently or inaccurately represent non-translational motion. Some block-based hybrid video coding techniques, or codecs, may include warped motion video coding, including warped motion compensation, which may improve the efficiency, accuracy, or both, relative to block-based hybrid video coding techniques that are limited to reducing temporal redundancy using a translational motion model, with respect to non-translational motion. For example, some block-based hybrid video coding techniques may include warped motion video coding using a global warp motion model, a local warp motion model, or both. Some block-based hybrid video coding techniques, or codecs, that include warped motion video coding may signal warped motion model parameters, such as warped motion model parameters for a global warp motion model, inefficiently. Some block-based hybrid video coding techniques, or codecs, that include warped motion video coding may omit signaling warped motion model parameters, such as warped motion model parameters for a local warp motion model.

The encoding and decoding using warped reference list for warped motion video coding described herein improves on video coding techniques, or codecs, that are limited to reducing temporal redundancy using a translational motion model, by including the use of a warped motion model to represent non-translational motion. The encoding and decoding using warped reference list for warped motion video coding described herein improves on video coding techniques, or codecs, that inefficiently signal, or omit signaling, warped motion model parameters, by obtaining a warped reference list including one or more candidate sets of warped motion model parameters at the encoder and at the decoder, using warped motion model parameters from the warped reference list as predictor, predicted, or reference warped motion model parameters, and differentially signaling the warped motion model parameters used for coding the current block by signaling a difference between the reference warped motion model parameters and the warped motion model parameters used for coding the current block.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium (a non-transitory computer-readable storage medium), such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
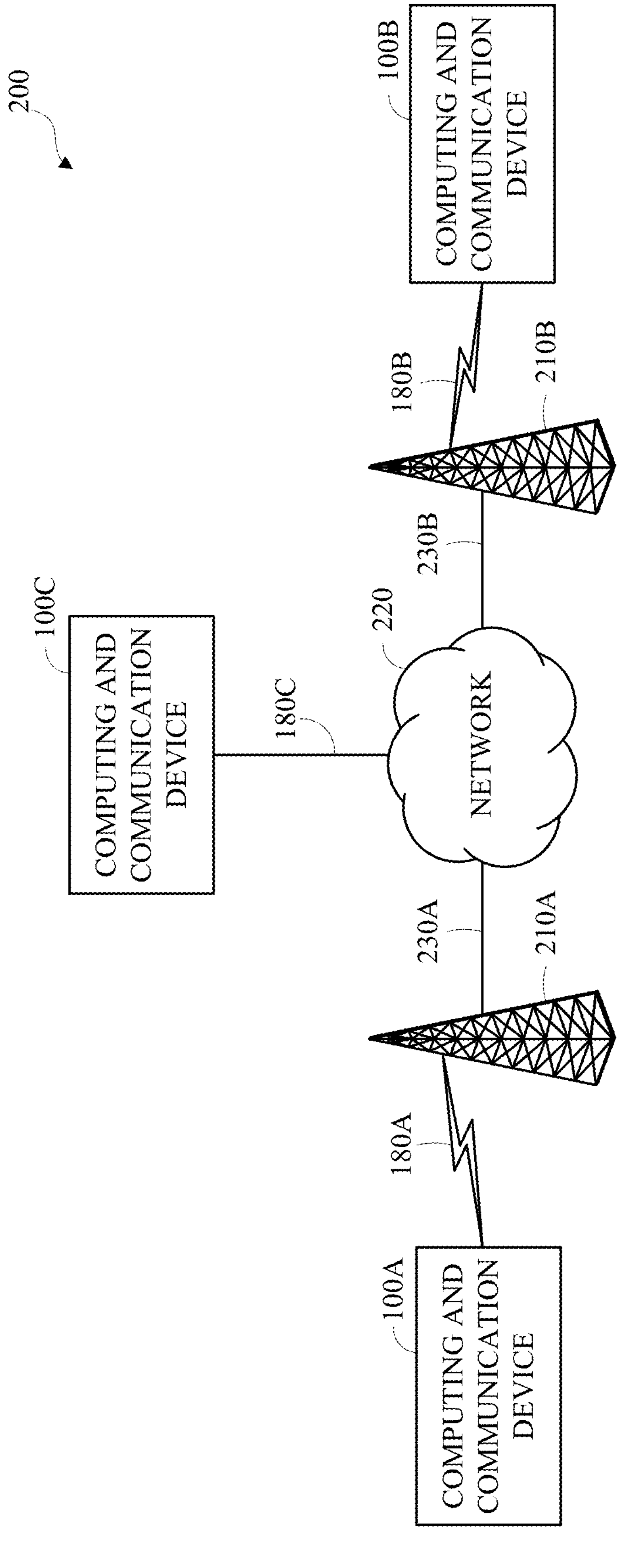
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
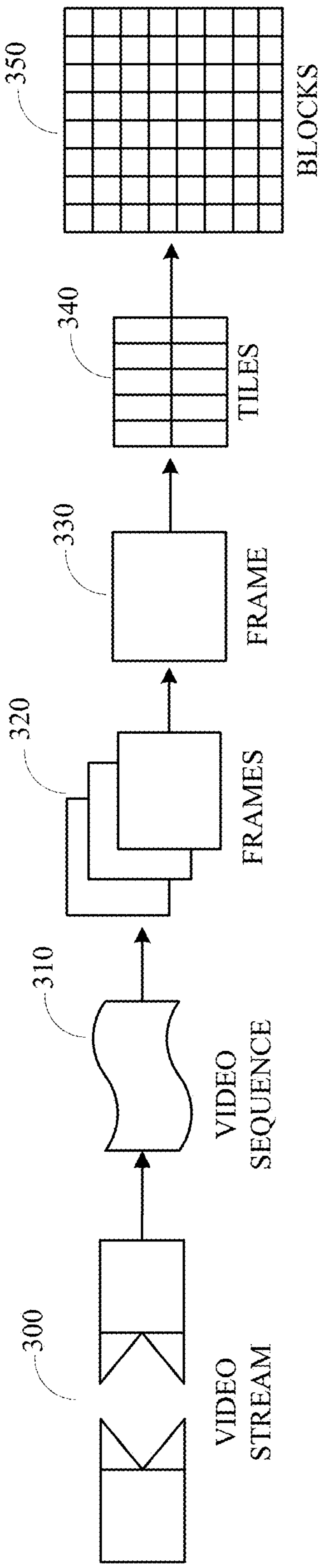
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
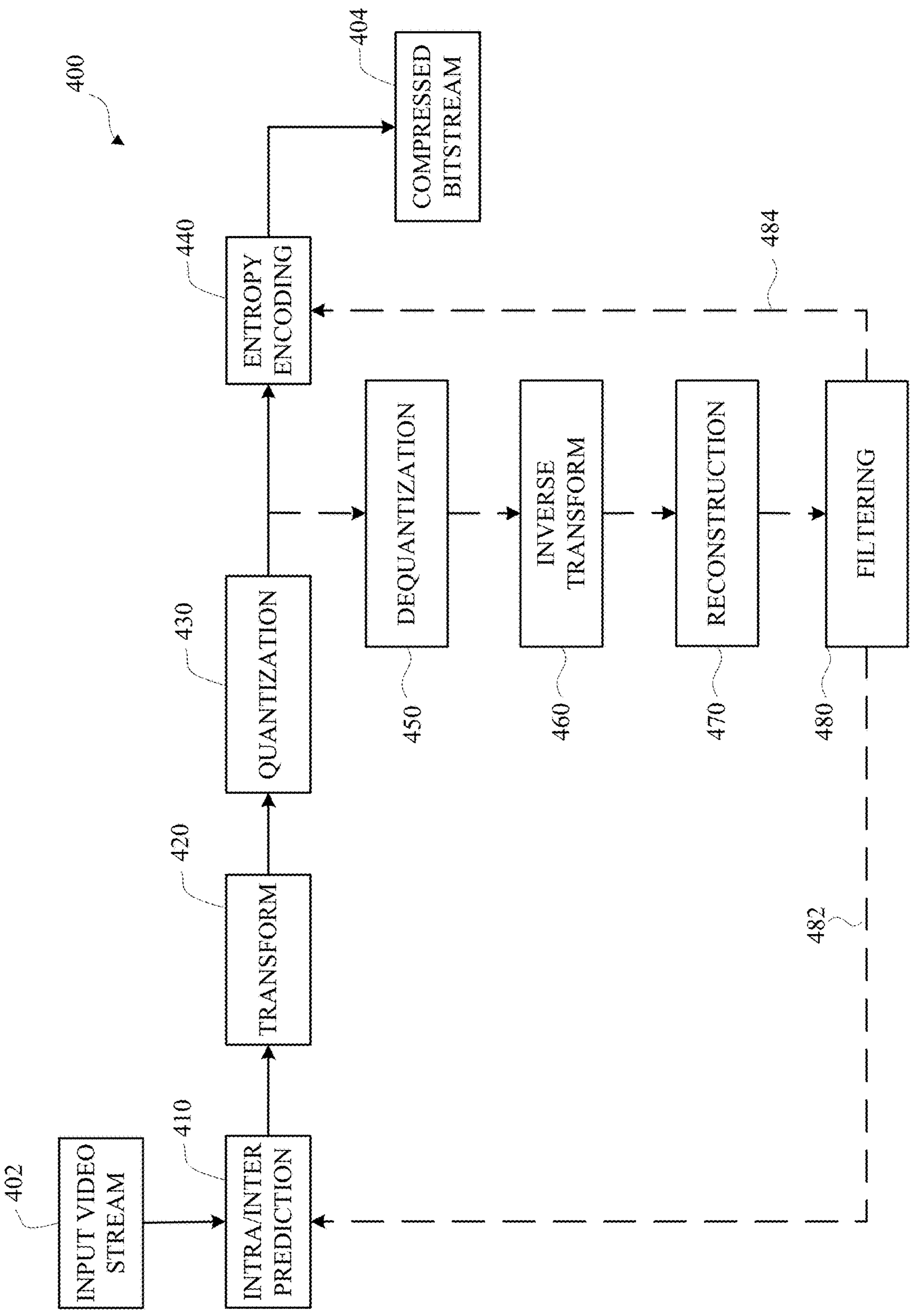
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC (direct current)) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
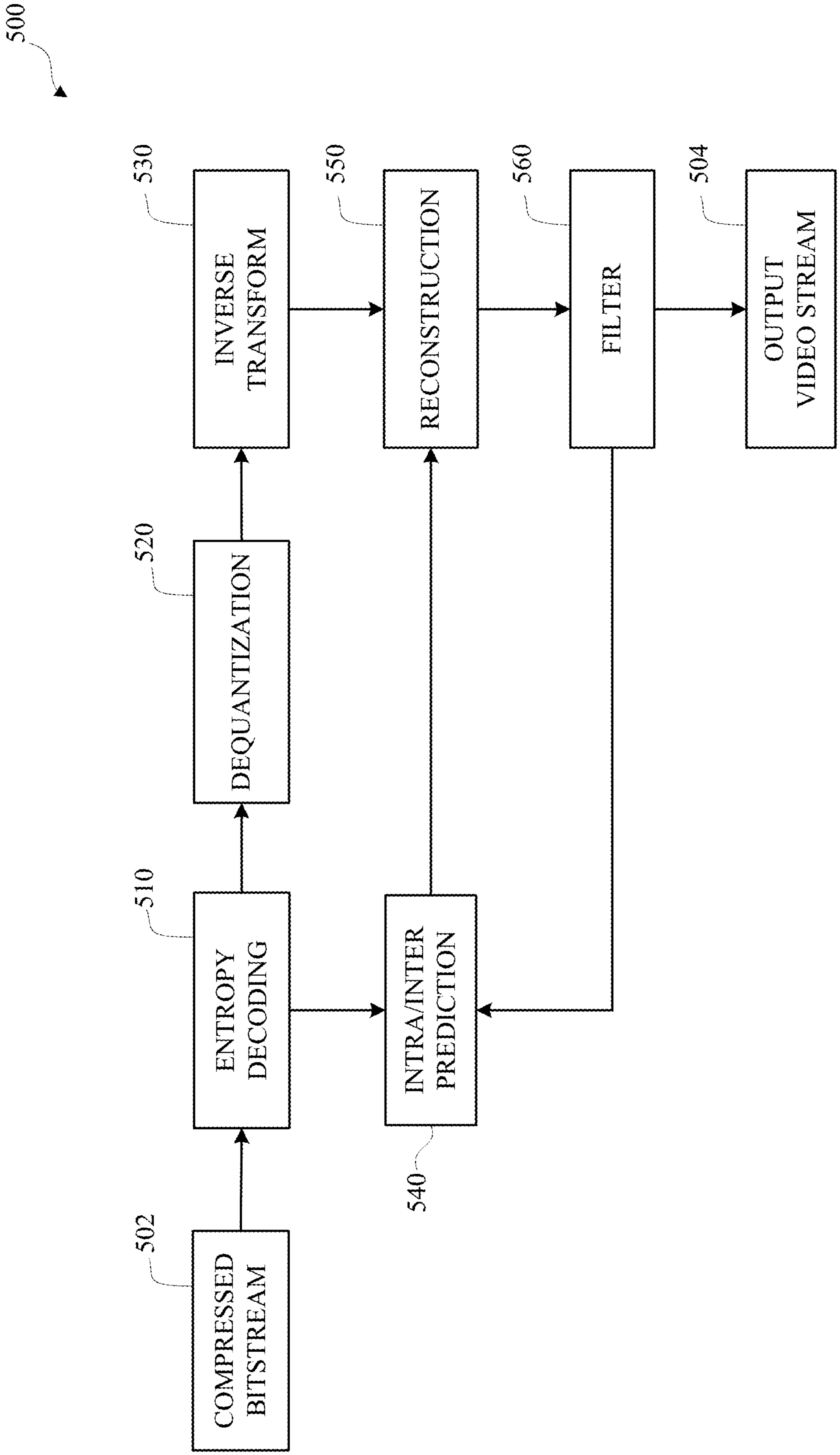
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 560.

Figure 6:
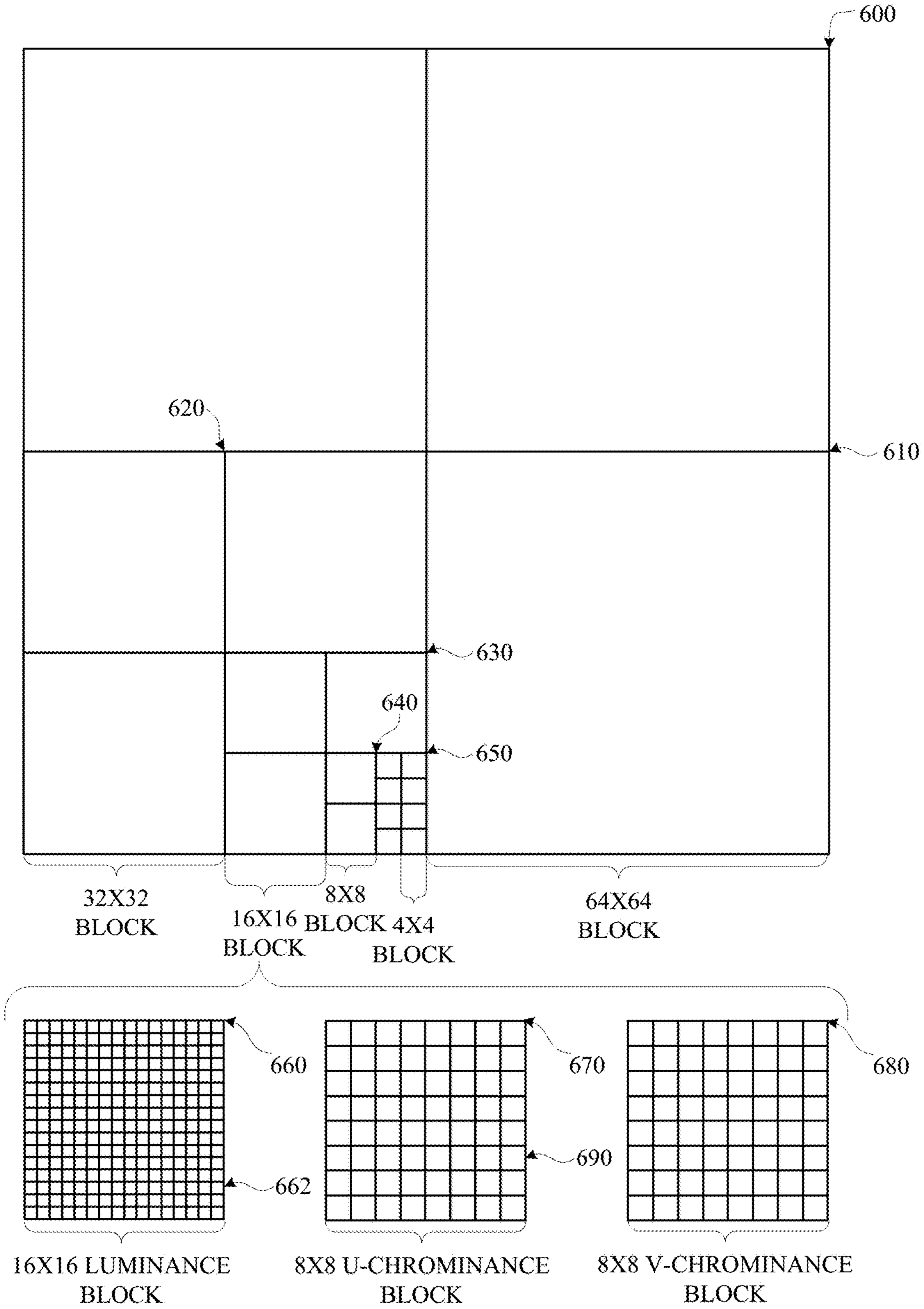
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding, such as video coding using transform partitioning, may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding, such as video coding using transform partitioning, may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
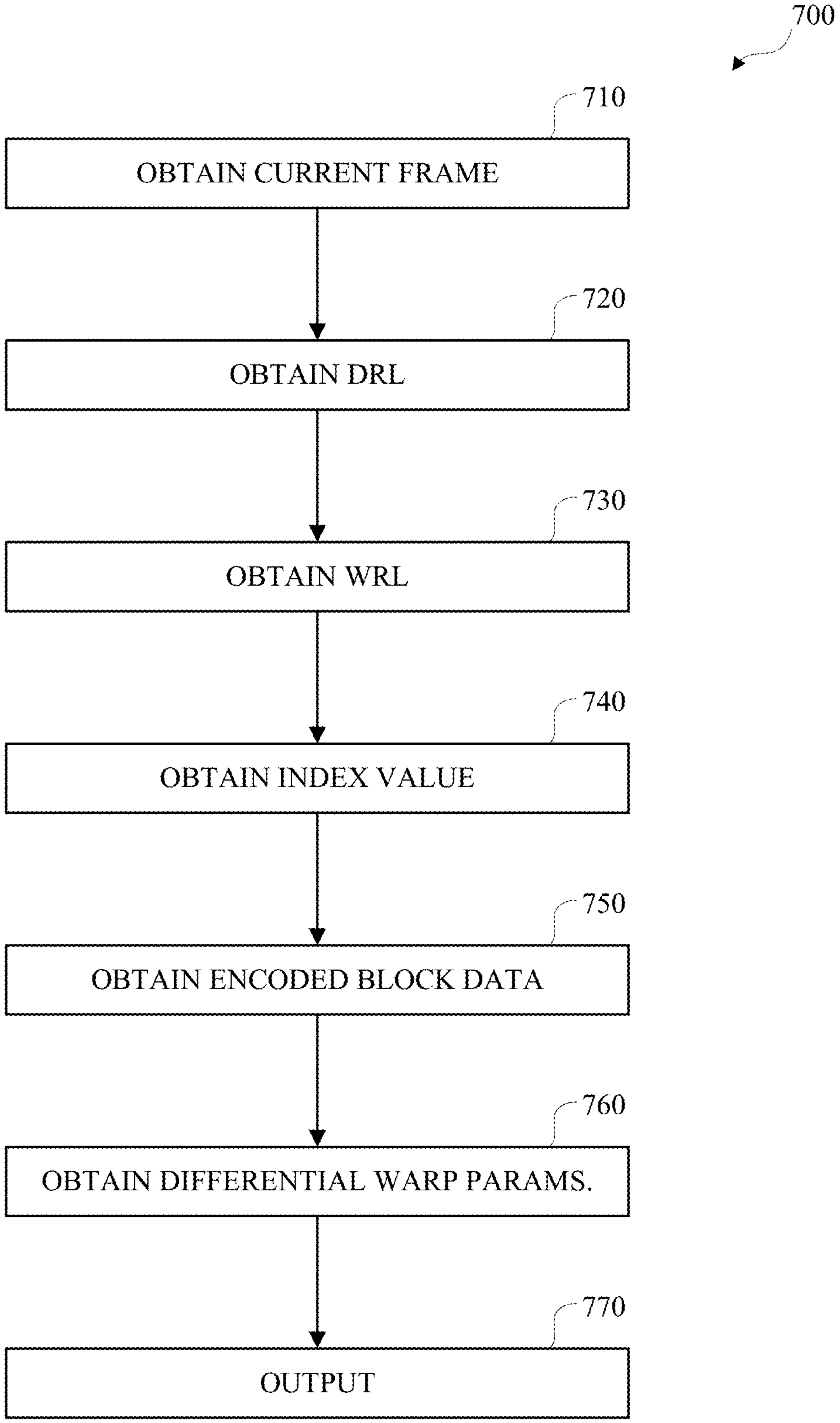
FIG. 7 is a flowchart diagram of an example of encoding using warped reference list for warped motion video coding in accordance with implementations of this disclosure.

FIG. 7 is a flowchart diagram of an example of encoding using warped reference list for warped motion video coding 700 in accordance with implementations of this disclosure. Encoding using warped reference list for warped motion video coding 700 may be implemented in an encoder, such as the encoder 400 shown in FIG. 4.

Encoding using warped reference list for warped motion video coding 700 includes encoding an input video steam, such as the input video stream 402 shown in FIG. 4, or one or more portions thereof, to generate an encoded (compressed) output bitstream, such as the encoded (compressed) bitstream 404 shown in FIG. 4. In block-based hybrid video coding, to reduce, or minimize, the resource utilization, such as bandwidth utilization, for signaling, storing, or both, compressed, or encoded, video data, redundant data, such as spatially redundant data, temporally redundant data, or both, is omitted or excluded from the compressed, or encoded, data. For example, spatial redundancy may be reduced using intra prediction, wherein the current block is predicted from the current frame. In another example, temporal redundancy may be reduced using inter prediction, wherein the current block is predicted from one or more reference frames, which may be previously decoded (and reconstructed) frames, constructed reference frames, or both.

The encoder may maintain, such as store in local memory, such as in a decoded frame buffer (or reference frame buffer, or reconstructed frame buffer), one or more reconstructed frames, which may be used reference frames for inter prediction. The reconstructed reference frames may include one or more recently output, or displayed, reconstructed frames. The reconstructed reference frames may include one or more previously output, or displayed, reconstructed frames, output, or displayed, prior to outputting, or displaying, the recently output, or displayed, reconstructed frames, such as golden, or key, frames, which may be intra coded frames. The reconstructed reference frames may include one or more frames that are designated as output, or display (displayable) frames. The reconstructed reference frames may include one or more alternate, or constructed, reference frames, which may be non-displayed frames, and which may be synthesized, or constructed, by the encoder, such as using temporal filtering along the motion trajectories of multiple frames. A reference frame in the reference frame buffer may be identified, or identifiable, using an index value (reference frame index value) with respect to the reference frame buffer wherein a location, or position, in the reference frame buffer is uniquely identifiable by a respective index vale. To reduce, or minimize, the resource utilization, such as bandwidth utilization, for signaling, storing, or both, data identifying the reference frame, or reference frames, used for inter coding, the reference frame, or reference frames, may be expressed, represented, or communicated, by signaling the corresponding reference frame index value. In some implementations, the reference frame index value may be signaled differentially, wherein a difference between the reference frame index value for the current block and a reference frame index value obtained from a neighboring previously coded block is signaled.

Inter prediction includes motion estimation to obtain motion data in accordance with a motion model, such as a translational motion model or a warped motion model. Motion expressed in accordance with a translational motion model may include translational motion vectors that indicate a displacement between a location of a current block in the current frame and a location in the reference frame. In some implementations, motion vectors with respect to multiple reference frames, such as a forward reference frame and a backward reference frame, may be used.

To reduce, or minimize, the resource utilization, such as bandwidth utilization, for signaling, storing, or both, translational motion vectors, the translational motion vectors may be signaled differentially, wherein a difference between a respective translational motion vector for the current block and a reference motion vector (predicted motion vector or motion vector predictor) obtained from one or more context blocks. The context blocks are previously reconstructed blocks spatially (corresponding to spatial motion vector predictors), or temporally (corresponding to temporal motion vector predictors), neighboring the current block.

Spatial, translational, motion vector predictors can be identified from context blocks spatially neighboring the current block in the current frame, including adjacent spatial neighboring blocks, which are direct neighbors of the current block in the current frame, such as blocks above the current block, blocks to the left of the current block, a block above and to the left of the current block, a block above and to the right of the current block, or a combination thereof, and non-adjacent spatial neighboring blocks, such as blocks that are adjacent, such as within a defined distance, such as two rows or two columns, of blocks that are immediately adjacent to the current block. Temporal, translational, motion vector predictors can be identified from one or more collocated context blocks temporally neighboring the current block.

Motion, other than translational motion, which may be inaccurately represented using translational motion vectors, may be expressed in accordance with a warped motion model, such as a homographic warped motion model, an affine warped motion model, a similarity warped motion model, or another warped motion model.

A homographic warped motion model includes eight parameters to indicate displacement between pixels of the current block and pixels of the reference frame, such as in a quadrilateral portion of the reference frame, for generating a prediction block. A homographic warped motion model may represent translation, rotation, scaling, changes in aspect ratio, shearing, and other non-parallelogram warping. A current pixel at position (x,y) has a current horizontal position in the current frame and a current vertical position in the current frame.

An affine warped motion model includes six-parameters to indicate displacement between pixels of the current block and pixels of the reference frame, such as in a parallelogram portion of the reference frame, for generating a prediction block. An affine warped motion model is a linear transformation between the coordinates of two spaces represented by the six-parameters. An affine warped motion model may represent translation, rotation, scale, changes in aspect ratio, and shearing. The parameters of the affine warped motion model include a first pair of parameters ($h_{13}$, $h_{23}$) that represent translational motion (translational parameters), such a horizontal translational motion parameter ($h_{13}$) and a vertical translational motion parameter ($h_{23}$). The parameters of the affine warped motion model include a second pair of parameters ($h_{11}$, $h_{22}$) that represent scaling (scaling parameters), such a horizontal scaling parameter ($h_{11}$) and a vertical scaling parameter ($h_{22}$). The parameters of the affine warped motion model include a third pair of parameters ($h_{12}$, $h_{21}$) that, in conjunction with the scaling parameters, represent angular rotation (rotation parameters). For example, for a current pixel at position (x,y) from the current frame, a corresponding position (x', y') from the reference frame may be indicated using the affine warped motion model, which may include a horizontal displacement (x') for encoding the current block that is a result of adding a result of multiplying the horizontal scaling parameter by the current horizontal position, a result of multiplying the first rotation parameter by the current vertical position, and the horizontal translational motion parameter, and a vertical displacement (y') for encoding the current block that is a result of adding a result of multiplying the vertical scaling parameter by the current horizontal position, a result of multiplying the second rotation parameter by the current vertical position, and the vertical translational motion parameter, which may be expressed as the following:

$$x' = h_{11}x + h_{12}y + h_{13}, \quad \text{[Equation 1]}$$

$$y' = h_{21}x + h_{21}y + h_{23}. \quad \text{[Equation 2]}$$

A similarity warped motion model includes four-parameters to indicate displacement between pixels of the current block and pixels of the reference frame, such as in a square portion of the reference frame, for generating a prediction block. A similarity warped motion model is a linear transformation between the coordinates of two spaces represented by the four-parameters. For example, the four-parameters can be a translation along the x-axis, a translation along the y-axis, a rotation value, and a zoom value. A similarity warped motion model may represent square-to-square transformation with rotation and zoom. The parameters of the similarity warped motion model include a first pair of parameters ($h_{13}$, $h_{23}$) that represent translational motion (translational parameters), such a horizontal translational motion parameter ($h_{13}$) and a vertical translational motion parameter ($h_{23}$). The parameters of the similarity warped motion model include a second parameter ($h_{11}$) that represent scaling (scaling parameter) ($h_{22}=h_{11}$). The parameters of the similarity warped motion model include a third parameter ($h_{21}$) that, in conjunction with the scaling parameter, represent angular rotation (rotation parameter) ($h_{12}=h_{21}$). For example, for a current pixel at position (x,y) from the current frame, a corresponding position (x', y') from the reference frame may be indicated using the similarity warped motion model, which may include a horizontal displacement (x') for encoding the current block that is a result of adding a result of subtracting a result of multiplying the rotation parameter by the current vertical position, from a result of multiplying the horizontal scaling parameter by the current horizontal position, and the horizontal translational motion parameter, and a vertical displacement (y') for encoding the current block that is a result of adding a result of multiplying the rotation parameter by the current horizontal position, a result of multiplying the horizontal scaling parameter by the current vertical position, and the vertical translational motion parameter, which may be expressed as the following:

$$x' = h_{11}x + h_{21}y + h_{13}, \quad \text{[Equation 3]}$$

$$y' = h_{21}x + h_{11}y + h_{23}. \quad \text{[Equation 4]}$$

The parameters of a warped motion model, other than the translational parameters, are non-translational parameters. In some implementations, a global warp model, which may represent frame level scaling and rotation, which may correspond with rigid motion, which may be associated with a respective reference frame, may be used, which may include expressing the non-translational parameters ($h_{11}$, $h_{12}$, $h_{21}$, $h_{22}$) with twelve-bit (12-bit) precision and expressing the translational parameters ($h_{13}$, $h_{23}$) with fifteen-bit (15-bit) precision. In some implementations, a local, block level or causal, warp model, which may be obtained, or derived, by fitting a model to context motion vectors using least-squares, may be used.

Encoding using warped reference list for warped motion video coding 700 includes obtaining a current frame (at 710), obtaining a translational dynamic reference list (at 720), obtaining a warped reference list (at 730), obtaining a warped reference list index value (at 740), obtaining encoded block data (at 750), obtaining differential warped model parameters (at 760), and outputting an output bitstream (at 770).

A current frame is obtained (at 710). The current frame is a frame from the input video, or input video stream. In some implementations, the input video stream may include one or more sequences of frames. A sequence of frames may have a defined cardinality, or number, of frames. For example, the encoder, or a component thereof, such as an intra/inter prediction unit of the encoder, such as the intra/inter prediction unit 410 shown in FIG. 4, may obtain the input video stream. The current frame may be obtained (at 710) subsequent to encoding one or more other frames, such as a frame sequentially preceding the current frame in the input video stream, and generating, or otherwise obtaining, a corresponding reconstructed frame (or frames), or one or more portions thereof, for use as a reference frame (or frames) for encoding the current frame.

Obtaining the current frame (at 710) includes obtaining a current block from the current frame. Although not shown separately in FIG. 7, encoding using warped reference list for warped motion video coding 700 may include encoding, reconstructing, or both, one or more portions of the current frame prior to encoding the current block.

Encoding the current block includes obtaining, such as by generating, a list, or array, of motion vectors (Dynamic Reference List (DRL), or translational dynamic reference list) generated from context blocks (at 720).

The dynamic reference list includes a list of reference motion vectors, respectively identified, or identifiable, by a corresponding dynamic reference list index value. Although not shown separately in FIG. 7, encoding using warped reference list for warped motion video coding 700 includes obtaining the motion vector, which may be an optimal candidate translational motion vector, for encoding the current block. The motion vector, or motion vectors, used as a motion vector predictor for encoding the current block may be output, or signaled, by including the corresponding dynamic reference list index value in the output bitstream. The motion vector identified for encoding the current block may differ from the motion vector predictor for encoding the current block, and a differential motion vector, which may be a difference between the motion vector identified for encoding the current block and the motion vector predictor identified for encoding the current block, may be included in the output bitstream. The context block corresponding to the motion vector predictor may be referred to as the motion vector predictor (MVP) block.

To obtain the dynamic reference list, the context blocks for encoding the current block may be examined, or evaluated, such as in a defined order, or sequence, to identify one or more translational motion vector predictors for inclusion in the dynamic reference list. Determining whether to identify a candidate motion vector used for encoding a context block as a motion vector predictor for the current block, and include the candidate motion vector in the dynamic reference list as an available motion vector predictor for the current block, may include determining whether the candidate motion vector refers to the reference frame identified for encoding the current block, such as by comparing the reference frame index value associated with the candidate motion vector and the reference frame index value associated with encoding the current block. In some implementations, the reference frame index associated with the candidate motion vector may differ from the reference frame index associated with encoding the current block, and the candidate motion vector may be omitted, or excluded, from use as a motion vector predictor for encoding the current block. In some implementations, the reference frame index associated with the candidate motion vector may be, or match, the reference frame index associated with encoding the current block, and the candidate motion vector may be included in the dynamic reference list for encoding the current block. A motion vector may be included in the dynamic reference list for encoding the current block in association with a dynamic reference list index value. The combination of horizontal displacement, vertical displacement, and temporal displacement may be represented using a translational motion model, wherein a motion vector that indicates a horizontal displacement, a vertical displacement, and a temporal displacement is a translational motion vector representing translational motion.

Although not shown separately in FIG. 7, encoding using warped reference list for warped motion video coding 700 includes determining, such as for the current block of the current frame, whether to encode the current block with reference to a translational motion mode, using translational motion vectors, or a warped motion mode, using warped motion parameters. The respective rate-distortion error for respective candidate motion modes, such as one or more translational motion modes, one or more warped motion modes, or one or more translational motion modes and one or more warped motion modes, are determined. The rate-distortion error for a respective motion mode represents the rate cost of encoding the block using the respective motion mode as compared to the distortion cost for encoding the block using the respective motion mode. The motion mode corresponding to the minimal rate-distortion error is identified as the motion mode for the current block.

Figure 8:
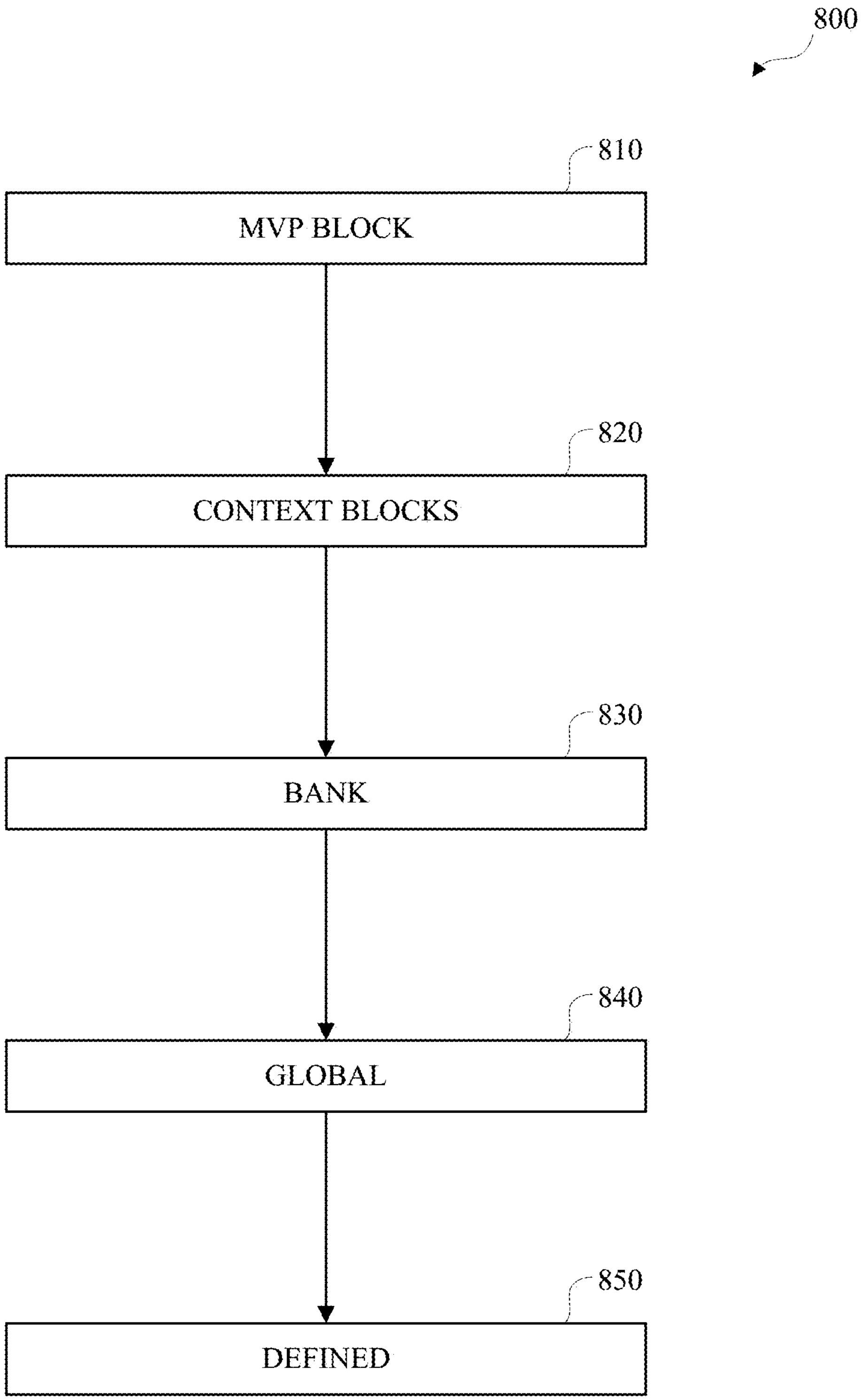
FIG. 8 is a flowchart diagram of an example of obtaining a warped reference list in accordance with implementations of this disclosure.

Encoding using warped reference list for warped motion video coding 700 includes obtaining a warped reference list (at 730). The warped reference list (WRL) may be an array, or list, of warp motion model parameters. The warped reference list may have a defined, or determined, size, or cardinality, (N), which may be a positive integer value, such as four (N=4). A respective element of the warped reference list includes parameters for a corresponding warped motion model. The warped motion parameters at a location, or position, in the warped reference list may be indicated, identified, or identifiable, by a warped reference list index value. For example, the cardinality of the warped reference list may be four (N=4) and the warped reference list may include first warped motion parameters at warped reference list index value zero (0), second warped motion parameters at warped reference list index value one (1), third warped motion parameters at warped reference list index value two (2), and fourth warped motion parameters at warped reference list index value three (3). An example of obtaining a warped reference list is shown in FIG. 8.

A current warped reference list index value is obtained (at 740) corresponding to optimal predicted warped model parameters from the warped reference list. To obtain, identify, or select, the current warped reference list index value, the encoder searches, or evaluates, the warped motion parameters from the warped reference list, such as sequentially or in parallel, and identifies the warped reference list index value corresponding to the warped motion parameters (optimal predicted warped model parameters) from the warped reference list that minimizes rate-distortion cost among the warped motion parameters from the warped reference list. In some implementations, the current warped reference list index value may be signaled, or included in the output bitstream, for the current block.

Encoded block data is obtained (at 750) by encoding the current block using warped motion compensation in accordance with optimal warped model parameters, which may differ from the optimal predicted warped model parameters. To obtain, or identify, the optimal warped model parameters the encoder may search, or evaluate, parameter values around the optimal predicted warped model parameters, such as using a spiral search or a gradient descent search. At a respective search point, the encoder may determine a corresponding rate-distortion metric, or cost. The encoder may identify the parameters corresponding to the minimal rate-distortion cost as the optimal warped model parameters.

Differential warped model parameters are obtained (at 760). Obtaining the differential warped model parameters includes obtaining, on a per-parameter basis, a difference, or delta, ($\Delta h_{mn}$) between the optimal warped model parameter ($h_{mn}$) and the corresponding optimal predicted warped model parameter ($h'_{mn}$), wherein $1 \leq m, n \leq 2$ for a six-parameter affine warped motion model or $1 \leq m \leq 2, n=1$ for a four-parameter similarity warped motion model, which may be expressed as the following:

$$\Delta h_{mn} = h_{mn} - h'_{mn}. \quad \text{[Equation 5]}$$

The differential warped model parameters are signaled by including the differential warped model parameters in an output bitstream and outputting the output bitstream (at 770).

In some implementations, the differential warped model parameters may be conditionally signaled. For example, the current warped reference list index value may be signaled, or included in the output bitstream, and the differential warped model parameters may be signaled, or included in the output bitstream, in response to a determination that the current warped reference list index value (warp_ref_idx) is less than a defined threshold, such as one (warp_ref_idx<1). In another example, the current warped reference list index value may be signaled, or included in the output bitstream, and, in response to a determination that the current warped reference list index value is greater than or equal to the defined threshold, the differential warped model parameters may be omitted, or excluded, from the output bitstream.

In some implementations, a bit, flag, or symbol, may be signaled, such as for the current block, indicating whether the warped motion model is a four-parameter similarity warped motion model or a six-parameter affine warped motion model.

In some implementations, the defined, or determined, size, or cardinality, (N) of the warped reference list may be identified in accordance with a prediction mode for the current block. For example, the prediction mode for the current block may be a new motion vector prediction mode, and the defined, or determined, size, or cardinality, (N) of the warped reference list may be four (N=4). In another example, the prediction mode for the current block may be other than the new motion vector prediction mode, and the defined, or determined, size, or cardinality (N) of the warped reference list may be one (N=1).

In some implementations, the defined, or determined, size, or cardinality (N) of the warped reference list may be signaled in the encoded bitstream by the encoder. The defined, or determined, size, or cardinality (N) of the warped reference list may be accessed, read, extracted, decoded, or otherwise obtained from the encoded bitstream by the decoder. The defined, or determined, size, or cardinality (N) of the warped reference list may be signaled, such as included in the output, or encoded, bitstream, for a portion of the video stream, such as for the current frame, for the current video sequence, or for another portion of the video stream. In some implementations, the defined, or determined, size, or cardinality (N) of the warped reference list may be defined, or determined, prior to coding the current block, the current tile, the current frame, or the current video and signaling the defined, or determined, size, or cardinality (N) of the warped reference list may be omitted.

FIG. 8 is a flowchart diagram of an example of obtaining a warped reference list 800 in accordance with implementations of this disclosure. Obtaining a warped reference list 800 may be implemented in an encoder, such as the encoder 400 shown in FIG. 4, or a decoder, such as the decoder 500 shown in FIG. 5. Obtaining a warped reference list 800 is similar to obtaining a warped reference list as shown at 730 in FIG. 7, except as is described herein or as is otherwise clear from context.

Obtaining the warped reference list 800 includes populating, generating, or otherwise obtaining, the warped reference list based on a motion vector predictor (MVP) block (at 810), one or more context blocks (at 820), a warped motion parameter bank (at 830), global warped motion parameters (at 840), and defined warped motion parameters (at 850).

Figure 9:
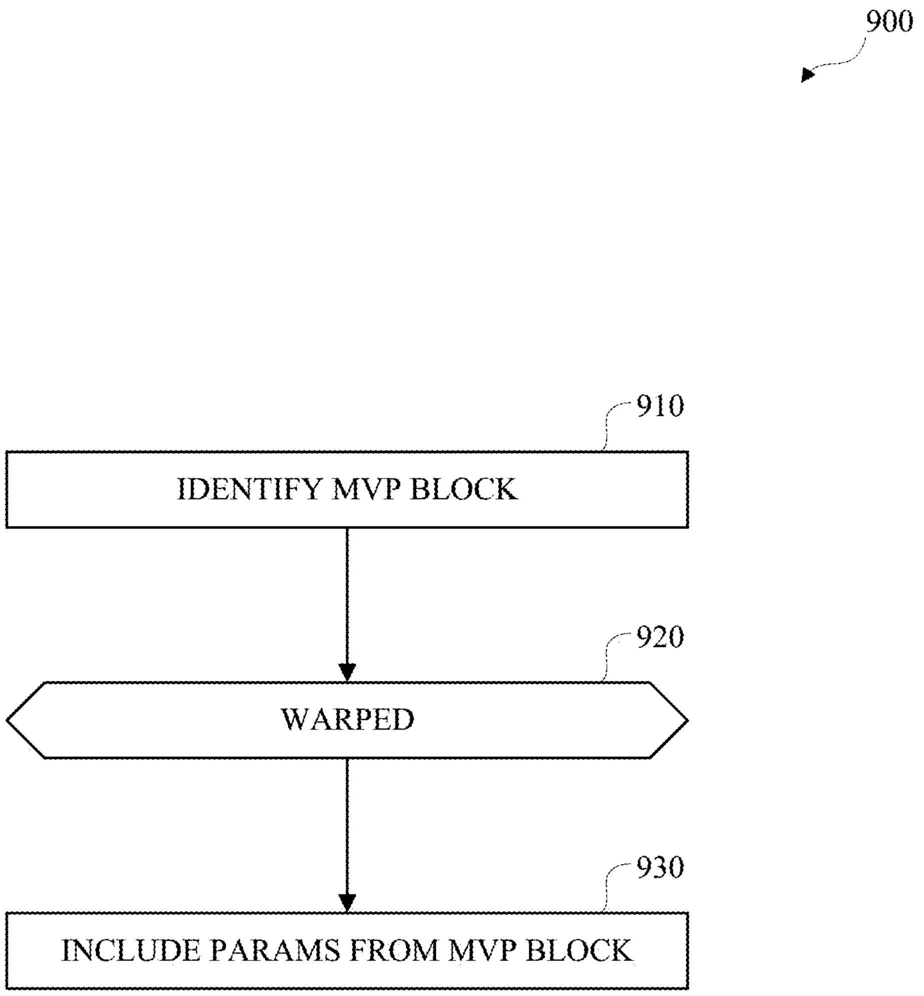
FIG. 9 is a flowchart diagram of an example of obtaining warped motion parameters based on the motion vector predictor block in accordance with implementations of this disclosure.

Obtaining the warped reference list 800 includes obtaining zero or more sets of warped motion parameters based on a motion vector predictor block using the translational motion data from the translational DRL for the current block (at 810). An example of obtaining warped motion parameters based on the motion vector predictor block is shown in FIG. 9.

Figure 10:
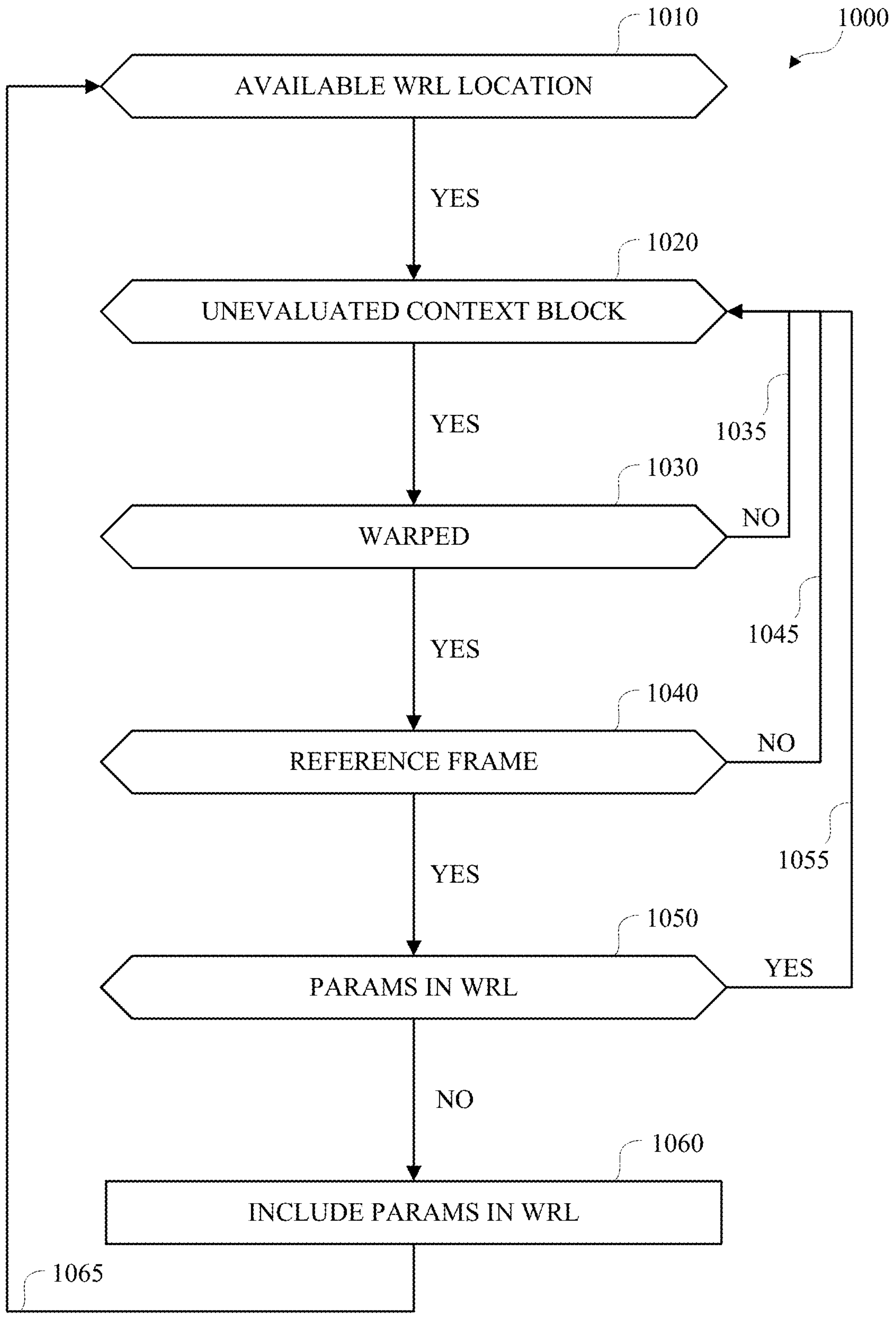
FIG. 10 is a flowchart diagram of an example of obtaining warped motion parameters based on one or more context blocks in accordance with implementations of this disclosure.
Figure 11:
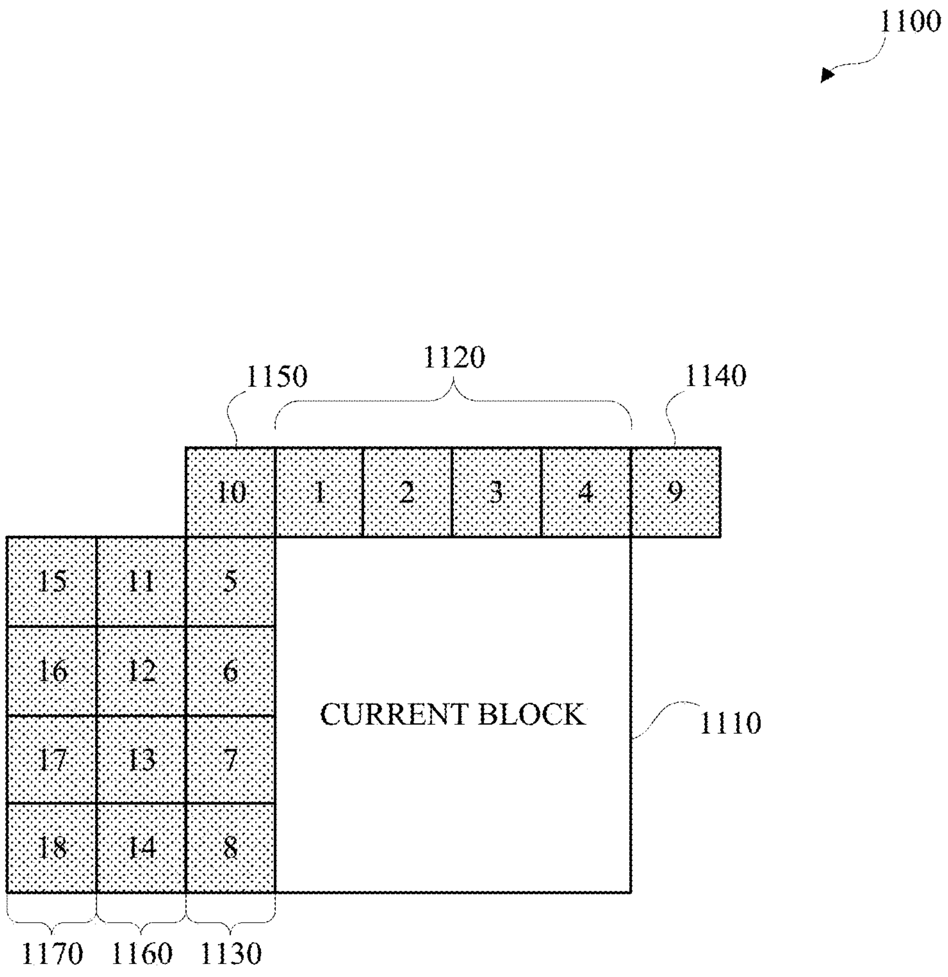
FIG. 11 is a block diagram of an example of a defined sequence, such as for obtaining warped motion parameters based on one or more context blocks in accordance with implementations of this disclosure.

Obtaining the warped reference list 800 includes obtaining zero or more sets of warped motion parameters based on one or more context blocks (at 820) in accordance with a defined sequence of context blocks. An example of obtaining warped motion parameters based on one or more context blocks is shown in FIG. 10. An example of a defined sequence of context blocks is shown in FIG. 11.

Figure 12:
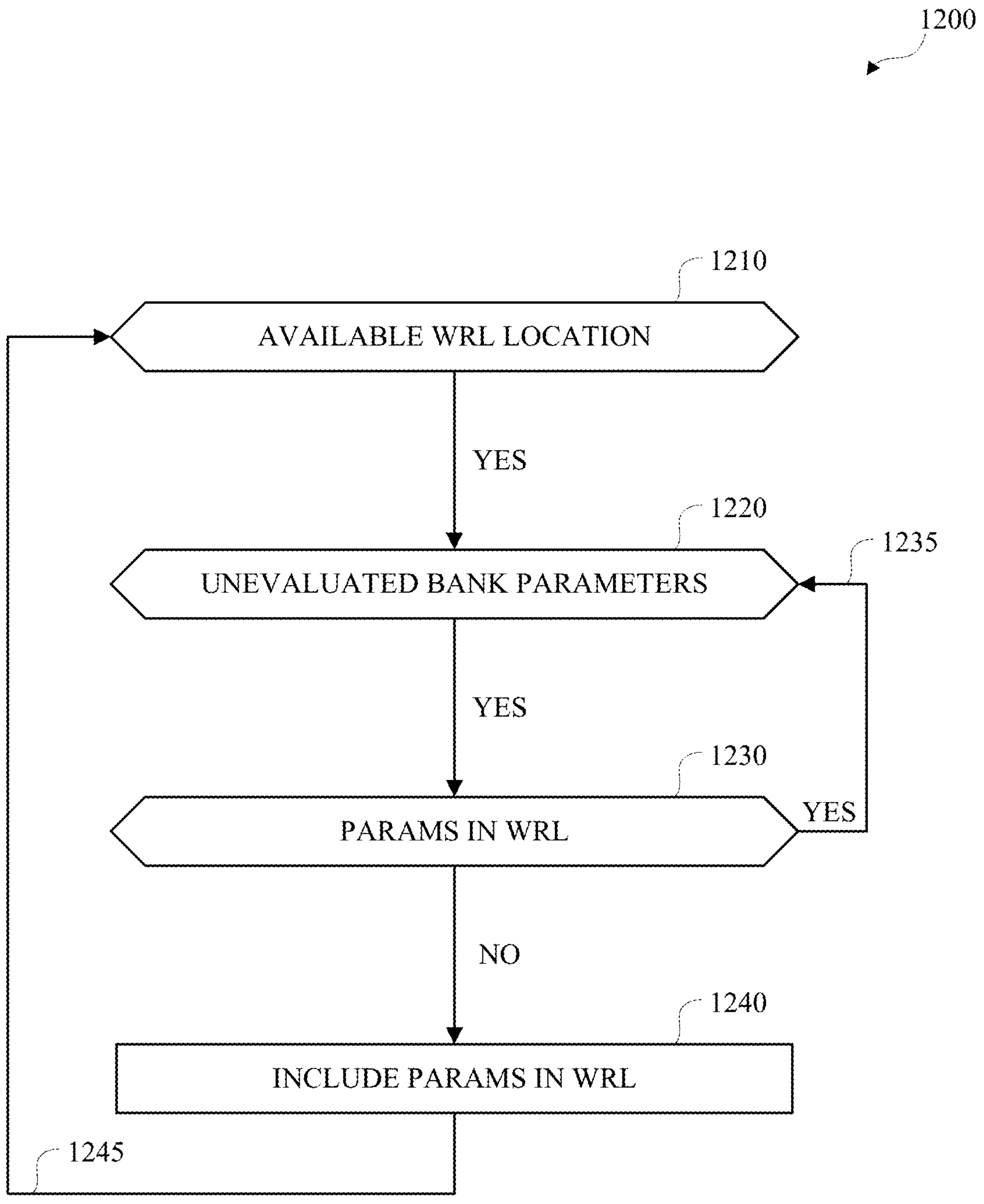
FIG. 12 is a flowchart diagram of an example of obtaining warped motion parameters based on a warped motion parameter bank in accordance with implementations of this disclosure.

Obtaining the warped reference list 800 includes obtaining zero or more sets of warped motion parameters based on the warped motion parameter bank (at 830). An example of obtaining warped motion parameters based on the warped motion parameter bank is shown in FIG. 12.

Figure 13:
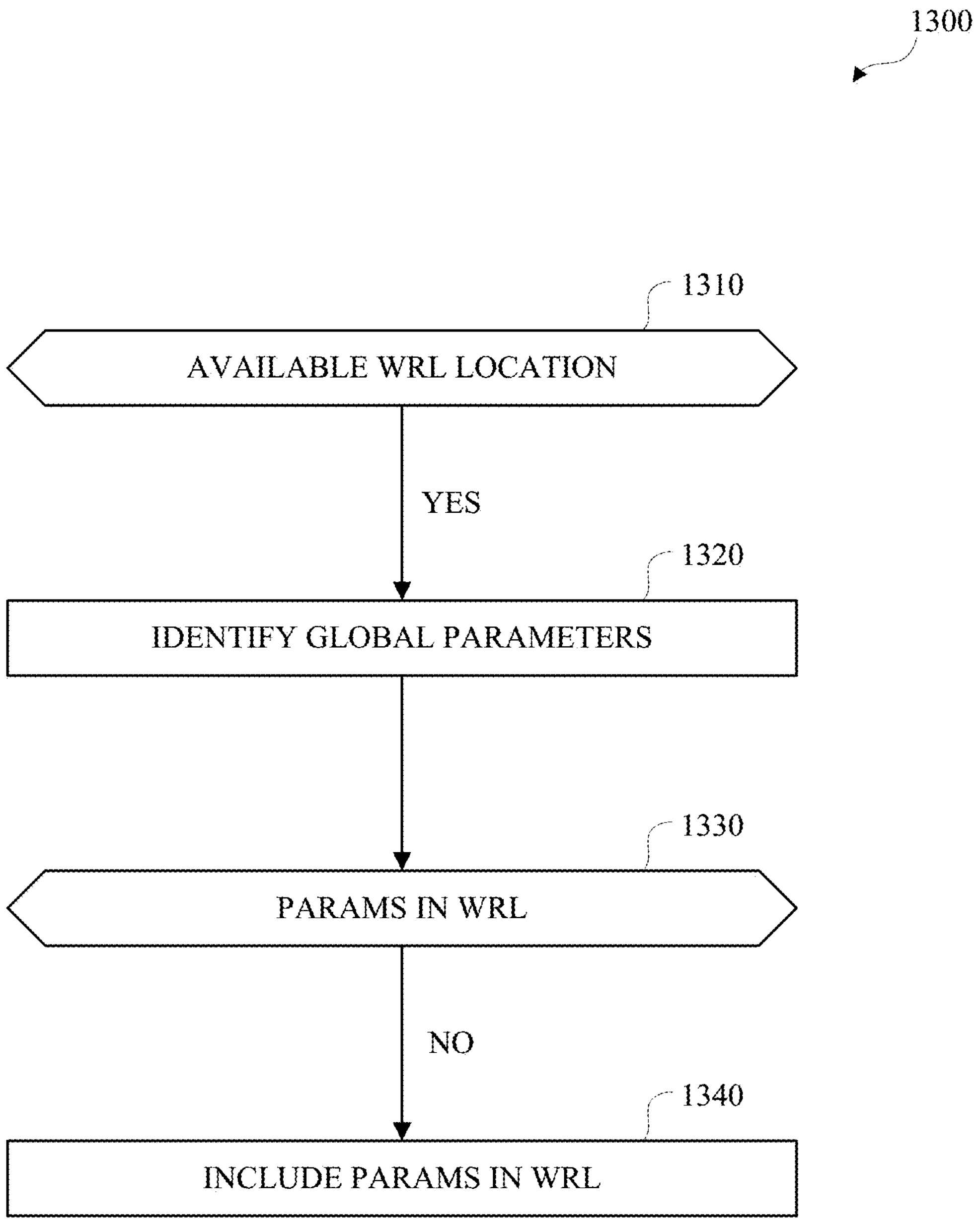
FIG. 13 is a flowchart diagram of an example of obtaining warped motion parameters based on global warped motion parameters associated with the current reference frame in accordance with implementations of this disclosure.

Obtaining the warped reference list 800 includes obtaining zero or more sets of warped motion parameters based on global warped motion parameters (at 840). An example of obtaining warped motion parameters based on global warped motion parameters is shown in FIG. 13.

Figure 14:
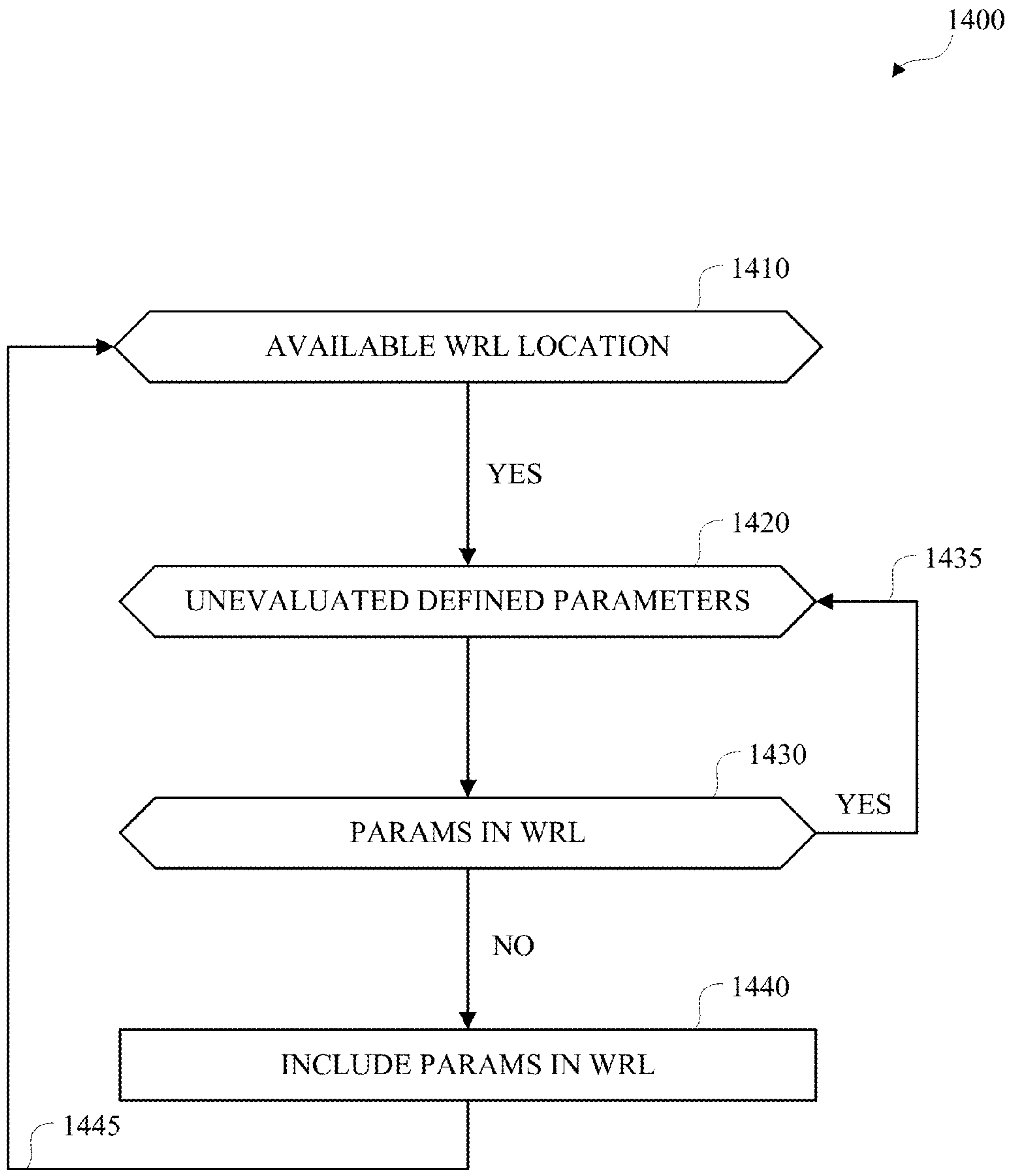
FIG. 14 is a flowchart diagram of an example of obtaining warped motion parameters based on defined warped motion parameters in accordance with implementations of this disclosure.

Obtaining the warped reference list 800 includes obtaining zero or more sets of warped motion parameters based on defined warped motion parameters (at 850). An example of obtaining warped motion parameters based on defined warped motion parameters is shown in FIG. 14.

FIG. 9 is a flowchart diagram of an example of obtaining warped motion parameters based on the motion vector predictor block 900 in accordance with implementations of this disclosure. Obtaining warped motion parameters based on the motion vector predictor block 900 may be implemented in an encoder, such as the encoder 400 shown in FIG. 4, or a decoder, such as the decoder 500 shown in FIG. 5.

Obtaining warped motion parameters based on the motion vector predictor block (translational motion vector prediction block) includes identifying the motion vector predictor (MVP) block (at 910), determining that the motion vector predictor block is coded using a warped motion prediction mode (at 920), and including warped motion parameters in the warped reference list (at 930).

The motion vector predictor block is identified (at 910). The motion vector predictor block is the context block corresponding to the motion vector predictor (translational motion vector) used for differentially coding the translational motion vector for the current block.

The encoder, or a component thereof, or the decoder, or a component thereof determines that the motion vector predictor block is coded using a warped motion prediction mode (at 920), which includes determining whether the motion vector predictor block is coded using a warped motion prediction mode.

Warped motion parameters from the motion vector predictor block are included in the warped reference list (at 930) at a sequentially minimal index location available in the warped reference list, such as the first index location, having the index value zero (0), in the warped reference list.

In some implementations, determining whether the motion vector predictor block is coded using a warped motion prediction mode (at 920) includes determining that the motion vector predictor block is coded using a prediction mode other than a warped motion prediction mode, such as a translational prediction mode, such that warped motion parameters are unavailable from the motion vector predictor block, and including warped motion parameters from the motion vector predictor block in the warped reference list (at 930) is omitted.

FIG. 10 is a flowchart diagram of an example of obtaining warped motion parameters based on one or more context blocks 1000 in accordance with implementations of this disclosure. Obtaining warped motion parameters based on one or more context blocks 1000 may be implemented in an encoder, such as the encoder 400 shown in FIG. 4, or a decoder, such as the decoder 500 shown in FIG. 5.

Obtaining warped motion parameters based on one or more context blocks 1000 includes determining that an index location is available in the warped reference list (at 1010), determining whether an unevaluated context block is available (at 1020), determining that the unevaluated context block is coded using a warped motion prediction mode (at 1030), determining that the unevaluated context block is coded with reference to a current reference frame (at 1040), determining that warped motion parameters from the unevaluated context block differ from the warped motion parameters in the warped reference list (at 1050), and including the warped motion parameters from the unevaluated context block in the warped reference list (at 1060).

The encoder, or a component thereof, or the decoder, or a component thereof determines that an, or at least one, index location is available, unpopulated, or empty, in the warped reference list (at 1010), which includes determining whether an index location is available, unpopulated, or empty, in the warped reference list, wherein the index location is the sequentially, such as in increasing warped reference list index value order, minimal, or earliest, available, unpopulated, or empty, index location. For example, the warped reference list may include warped motion parameters obtained from the motion vector predictor block, such as shown in FIG. 9, in the first location, or position, in the warped reference list corresponding to the warped reference list index value zero (0), the other locations in the warped reference list may be available, and the index location corresponding to the index value one (1) is identified as the sequentially minimal index location available in the warped reference list. In some implementations, the encoder, or a component thereof, or the decoder, or a component thereof may determine that an index location is unavailable in the warped reference list, such as wherein the index locations of the warped reference list include respective warped motion parameters, and obtaining warped motion parameters based on one or more context blocks 1000 may be otherwise omitted.

In response to determining that the sequentially minimal index location is available, unpopulated, or empty, in the warped reference list (at 1010), the encoder, or a component thereof, for encoding, or the decoder, or a component thereof, for decoding, determines that an unevaluated context block is available (at 1020), which includes determining whether an unevaluated context block is available among the context blocks for the current block. Determining that the unevaluated context block is available includes evaluating the context blocks for the current block in a defined sequence, or order, such as the sequence shown in FIG. 11. The unevaluated context block is a context block from the context blocks for the current block, other than context blocks from the context blocks for the current block previously evaluated in accordance with obtaining warped motion parameters based on one or more context blocks 1000 for the current block, that is the sequentially minimal, in the defined sequence, unevaluated context block (the sequentially minimal unevaluated context block). In some implementations, the encoder, or a component thereof, for encoding, or the decoder, or a component thereof, for decoding, may determine that an unevaluated context block is unavailable among the context blocks for the current block, such as wherein the context blocks for the current block were previously evaluated in accordance with obtaining warped motion parameters based on one or more context blocks 1000 for the current block, and obtaining warped motion parameters based on one or more context blocks 1000 may be otherwise omitted.

In response to determining that the unevaluated context block is available (at 1020), the encoder, or a component thereof, for encoding, or the decoder, or a component thereof, for decoding, determines that the unevaluated context block is coded using a warped motion prediction mode (at 1030), which includes determining whether the unevaluated context block is coded using a warped motion prediction mode. In some implementations, the encoder, or a component thereof, for encoding, or the decoder, or a component thereof, for decoding, may determine that the unevaluated context block is coded using a motion prediction mode other than a warped motion prediction mode, such as the translational motion prediction mode, the current unevaluated context block may be identified as an evaluated context block, and the encoder, or a component thereof, for encoding, or the decoder, or a component thereof, for decoding, may determine whether another unevaluated context block is available (at 1020, as indicated by the directional line 1035).

In response to determining that the unevaluated context block is coded using a warped motion prediction mode (at 1030) (a context block previously encoded using warped motion prediction), the encoder, or a component thereof, for encoding, or the decoder, or a component thereof, for decoding, determines that the unevaluated context block is coded with reference to a current reference frame (at 1040), which includes determining whether the unevaluated context block is coded with reference to the current reference frame, wherein encoding the current block includes encoding the current block with reference to the current reference frame. The current reference frame may be indicated by a current reference frame index. In some implementations, the encoder, or a component thereof, for encoding, or the decoder, or a component thereof, for decoding, may determine that the unevaluated context block is coded with reference to a reference frame other than the current reference frame, the current unevaluated context block may be identified as an evaluated context block, and the encoder, or a component thereof, for encoding, or the decoder, or a component thereof, for decoding, may determine whether another unevaluated context block is available (at 1020, as indicated by the directional line 1045).

In response to determining that the unevaluated context block is coded with reference to the current reference frame (at 1040), the encoder, or a component thereof, for encoding, or the decoder, or a component thereof, for decoding, determines that warped motion parameters from the unevaluated context block differ from the warped motion parameters in the warped reference list (at 1050), which includes determining whether the warped motion parameters from the unevaluated context block differ from the warped motion parameters in the warped reference list. In some implementations, the encoder, or a component thereof, for encoding, or the decoder, or a component thereof, for decoding, may determine that the warped motion parameters from the unevaluated context block match warped motion parameters in the warped reference list, the current unevaluated context block may be identified as an evaluated context block, and the encoder, or a component thereof, for encoding, or the decoder, or a component thereof, for decoding, may determine whether another unevaluated context block is available (at 1020, as indicated by the directional line 1055).

In response to determining that warped motion parameters from the unevaluated context block differ from the warped motion parameters in the warped reference list (at 1050), the encoder, or a component thereof, for encoding, or the decoder, or a component thereof, for decoding, includes the warped motion parameters from the unevaluated context block in the warped reference list (at 1060) at a sequentially minimal index location available in the warped reference list, such as the second index location, having the index value one (1), in the warped reference list.

Subsequent to including the warped motion parameters from the unevaluated context block in the warped reference list (at 1060) obtaining warped motion parameters based on one or more context blocks 1000 may be repeated or iterated (as indicated by the directional line at 1065).

FIG. 11 is a block diagram of an example of a defined sequence 1100, such as for obtaining warped motion parameters based on one or more context blocks (such as shown at 1000 in FIG. 10), in accordance with implementations of this disclosure.

FIG. 11 shows the current block 1110 as a 4×4 block. Other size blocks may be used. The defined sequence 1100 includes context blocks, which are previously reconstructed blocks spatially neighboring the current block 1110 in the current frame. As shown in FIG. 11, the context blocks are labeled with numbers indicating the respective position, or order, of the respective context block in the defined sequence 1100.

The defined sequence 1100 includes top context blocks from a row 1120 spatially adjacent to the current block 1110 above the current block 1110, which, in left to right order, includes a first context block (1) from the row 1120 spatially adjacent to the current block 1110 above the current block 1110, a second context block (2) from the row 1120 spatially adjacent to the current block 1110 above the current block 1110 subsequent, in left to right order, to the first context block (1), a third context block (4) from the row 1120 spatially adjacent to the current block 1110 above the current block 1110 subsequent, in left to right order, to the second context block (2), and a fourth context block (4) from the row 1120 spatially adjacent to the current block 1110 above the current block 1110 subsequent, in left to right order, to the third context block (3).

The defined sequence 1100 includes first left context blocks from a first column 1130 spatially adjacent to the current block 1110 to the left of the current block 1110, which, in top to bottom order, includes a fifth context block (5) from the first column 1130 spatially adjacent to the current block 1110 to the left of the current block 1110, a sixth context block (6) from the first column 1130 spatially adjacent to the current block 1110 to the left of the current block 1110 subsequent, in top to bottom order, to the fifth context block (5), a seventh context block (7) from the first column 1130 spatially adjacent to the current block 1110 to the left of the current block 1110 subsequent, in top to bottom order, to the sixth context block (6), and an eighth context block (8) from the first column 1130 spatially adjacent to the current block 1110 to the left of the current block 1110 subsequent, in top to bottom order, to the seventh context block (7).

The defined sequence 1100 includes, as a ninth context block (9), a top-right context block 1140 from a column spatially adjacent to the current block 1110 to the right of the current block 1110 and the row spatially adjacent to the current block 1110 above the current block 1110.

The defined sequence 1100 includes, as a tenth context block (10), a top-left context block 1150 from the column spatially adjacent to the current block 1110 to the left of the current block 1110 and the row spatially adjacent to the current block 1110 above the current block 1110.

The defined sequence 1100 includes second left context blocks from a second column 1160 spatially adjacent to the first column 1130 to the left of the first column 1130, which, in top to bottom order, includes an eleventh context block (11) from the second column 1160 spatially adjacent to the first column 1130 to the left of the first column 1130, a twelfth context block (12) from the second column 1160 spatially adjacent to the first column 1130 to the left of the first column 1130 subsequent, in top to bottom order, to the eleventh context block (11), a thirteenth context block (13) from the second column 1160 spatially adjacent to the first column 1130 to the left of the first column 1130 subsequent, in top to bottom order, to the twelfth context block (12), and a fourteenth context block (14) from the second column 1160 spatially adjacent to the first column 1130 to the left of the first column 1130 subsequent, in top to bottom order, to the thirteenth context block (13).

The defined sequence 1100 includes third left context blocks from a third column 1170 spatially adjacent to the second column 1160 to the left of the second column 1160, which, in top to bottom order, includes an fifteenth context block (15) from the third column 1170 spatially adjacent to the second column 1160 to the left of the second column 1160, a sixteenth context block (16) from the third column 1170 spatially adjacent to the second column 1160 to the left of the second column 1160 subsequent, in top to bottom order, to the fifteenth context block (15), a seventeenth context block (17) from the third column 1170 spatially adjacent to the second column 1160 to the left of the second column 1160 subsequent, in top to bottom order, to the sixteenth context block (16), and an eighteenth context block (18) from the third column 1170 spatially adjacent to the second column 1160 to the left of the second column 1160 subsequent, in top to bottom order, to the seventeenth context block (17).

FIG. 12 is a flowchart diagram of an example of obtaining warped motion parameters based on a warped motion parameter bank 1200 in accordance with implementations of this disclosure. Obtaining warped motion parameters based on the warped motion parameter bank 1200 may be implemented in an encoder, such as the encoder 400 shown in FIG. 4, or a decoder, such as the decoder 500 shown in FIG. 5.

The encoder, or a component thereof, for encoding, or the decoder, or a component thereof, for decoding, maintains, such as stores, a warped motion parameter bank, which may be a circular buffer, to store, record, or otherwise save, warped motion parameters, such as zero or more sets of warped motion parameters, previously used for coding one or more block of a current tile that includes the current block. The circular buffer for the current tile may be empty, such as in response to initialization or resetting, prior to coding the current tile, or in accordance with coding a sequentially first block of the current tile, or may include warped motion parameters, such as zero or more sets of warped motion parameters, previously used for coding a block of a current tile. Subsequent to coding a block, or a super-block, from the current tile, using a warped motion mode, the warped motion parameters used for coding the block may be included, stored, recorded, or otherwise saved, in a location in the warped motion parameter bank corresponding to the location of the block in the current tile, a sequentially earliest, or lowest, available, empty, or unpopulated, location in the warped motion parameter bank, or in a sequentially last, or greatest, position, or location, in the warped motion parameter bank.

Including, storing, recording, or otherwise saving the warped motion parameters used for coding the block in the sequentially last, or greatest, position, or location, in the warped motion parameter bank, wherein the sequentially last, or greatest, position, or location, in the warped motion parameter bank includes warped motion parameters previously used for coding a block of the current tile, includes advancing the circular buffer, such that the warped motion parameters included in the sequentially first location, or position, in the warped motion parameter bank are removed from the in the warped motion parameter bank, identifying the sequentially first location, or position, in the warped motion parameter bank as the sequentially last location, or position, in the warped motion parameter bank, identifying the sequentially second location, or position, in the warped motion parameter bank as the sequentially first location, or position, in the warped motion parameter bank, and including the warped motion parameters used for coding the block in the sequentially last, or greatest, position, or location, in the warped motion parameter bank. Maintaining the warped motion parameter bank may include maintaining multiple distinct, or separate, warped motion parameter banks on a per-reference frame basis for the reference frames used for encoding the current tile, or a block thereof. The warped motion parameter bank may have a defined, or determined, size, or cardinality, such as sixteen (16). The defined, or determined, size, or cardinality, warped motion parameter bank may be signaled in the encoded bitstream by the encoder. The defined, or determined, size, or cardinality, warped motion parameter bank may be accessed, read, extracted, decoded, or otherwise obtained from the encoded bitstream by the decoder. In some implementations, the size, or cardinality, of the warped motion parameter bank may be defined prior to coding the current block, the current tile, the current frame, or the current video and signaling the size, or cardinality, of the warped motion parameter bank may be omitted.

Obtaining warped motion parameters based on the warped motion parameter bank 1200 includes determining that an index location is available in the warped reference list (at 1210), determining that unevaluated warped motion parameters (unevaluated bank parameters) are available from the warped motion parameter bank (at 1220), determining that the unevaluated bank parameters differ from the warped motion parameters in the warped reference list (at 1230), and including the unevaluated bank parameters in the warped reference list (at 1240).

The encoder, or a component thereof, for encoding, or the decoder, or a component thereof, for decoding, determines that an, or at least one, index location is available, unpopulated, or empty, in the warped reference list (at 1210), which includes determining whether an index location is available, unpopulated, or empty, in the warped reference list, wherein the index location is the sequentially, such as in increasing warped reference list index value order, minimal, or earliest, available, unpopulated, or empty, index location (sequentially minimal index location). In some implementations, the encoder, or a component thereof, or the decoder, or a component thereof may determine that an index location is unavailable in the warped reference list, such as wherein the index locations of the warped reference list include respective warped motion parameters, and obtaining warped motion parameters based on the warped motion parameter bank 1200 may be otherwise omitted.

In response to determining that the index location is available, unpopulated, or empty, in the warped reference list (at 1210), the encoder, or a component thereof, for encoding, or the decoder, or a component thereof, for decoding, determines that unevaluated warped motion parameters (unevaluated bank parameters) are available from the warped motion parameter bank (at 1220) for the current reference frame, wherein the current block is coded with reference to the current reference frame, which includes determining whether unevaluated warped motion parameters (unevaluated bank parameters) are available from the warped motion parameter bank for the current reference frame. Determining that the unevaluated warped motion parameters (unevaluated bank parameters) are available from the warped motion parameter bank (at 1220) for the current reference frame includes evaluating the warped motion parameters, or warped motion parameter sets, from the warped motion parameter bank for the current reference frame in a defined sequence, or order, such as from the sequentially first location, or position, in the warped motion parameter bank to the sequentially last location, or position, in the warped motion parameter bank.

The unevaluated bank parameters are warped motion parameters, or a warped motion parameter set, from the warped motion parameter bank for the current reference frame, other than warped motion parameters, or a warped motion parameter set, from the warped motion parameter bank for the current reference frame previously evaluated in accordance with obtaining warped motion parameters based on the warped motion parameter bank 1200 for the current block, that is the sequentially minimal, in the defined sequence, location, or position, in the warped motion parameter bank for the current reference frame. In some implementations, the encoder, or a component thereof, for encoding, or the decoder, or a component thereof, for decoding, may determine that unevaluated bank parameters are unavailable from the warped motion parameter bank for the current reference frame, such as wherein the warped motion parameters, or a warped motion parameter set, from the warped motion parameter bank for the current reference frame were previously evaluated in accordance with obtaining warped motion parameters based on the warped motion parameter bank 1200 for the current block, and obtaining warped motion parameters based on the warped motion parameter bank 1200 may be otherwise omitted.

In response to determining that the unevaluated bank parameters are available (at 1220), the encoder, or a component thereof, for encoding, or the decoder, or a component thereof, for decoding, determines that the unevaluated bank parameters differ from the warped motion parameters in the warped reference list (at 1230), which includes determining whether the unevaluated bank parameters differ from the warped motion parameters in the warped reference list. In some implementations, the encoder, or a component thereof, for encoding, or the decoder, or a component thereof, for decoding, may determine that the unevaluated bank parameters match warped motion parameters in the warped reference list, the unevaluated bank parameters may be identified as evaluated, and the encoder, or a component thereof, for encoding, or the decoder, or a component thereof, for decoding, may determine whether other unevaluated bank parameters are available (at 1220, as indicated by the directional line 1235).

In response to determining that unevaluated bank parameters differ from the warped motion parameters in the warped reference list (at 1230), the encoder, or a component thereof, for encoding, or the decoder, or a component thereof, for decoding, includes the unevaluated bank parameters in the warped reference list (at 1240) at the sequentially minimal index location available in the warped reference list, which may include identifying the unevaluated bank parameters as evaluated.

Subsequent to including the unevaluated bank parameters in the warped reference list (at 1240) obtaining warped motion parameters based on the warped motion parameter bank 1200 may be repeated or iterated (as indicated by the directional line at 1245).

FIG. 13 is a flowchart diagram of an example of obtaining warped motion parameters based on global warped motion parameters associated with the current reference frame 1300 in accordance with implementations of this disclosure. Obtaining warped motion parameters based on the global warped motion parameters associated with the current reference frame 1300 may be implemented in an encoder, such as the encoder 400 shown in FIG. 4, or a decoder, such as the decoder 500 shown in FIG. 5.

Obtaining warped motion parameters based on the global warped motion parameters associated with the current reference frame 1300 includes determining that an index location is available in the warped reference list (at 1310), identifying the global warped motion parameters associated with the current reference frame (at 1320), determining that the global warped motion parameters associated with the current reference frame differ from the warped motion parameters in the warped reference list (at 1330), and including the global warped motion parameters associated with the current reference frame in the warped reference list (at 1340).

The encoder, or a component thereof, for encoding, or the decoder, or a component thereof, for decoding, determines that an, or at least one, index location is available, unpopulated, or empty, in the warped reference list (at 1310), which includes determining whether an index location is available, unpopulated, or empty, in the warped reference list, wherein the index location is the sequentially, such as in increasing warped reference list index value order, minimal, or earliest, available, unpopulated, or empty, index location. In some implementations, the encoder, or a component thereof, or the decoder, or a component thereof may determine that an index location is unavailable in the warped reference list, such as wherein the index locations of the warped reference list include respective warped motion parameters, and obtaining warped motion parameters based on the global warped motion parameters associated with the current reference frame 1300 may be otherwise omitted.

In response to determining that the index location is available, unpopulated, or empty, in the warped reference list (at 1310), the encoder, or a component thereof, for encoding, or the decoder, or a component thereof, for decoding, identifies global warped motion parameters associated with the current reference frame (at 1320), wherein the current block is coded with reference to the current reference frame.

In some implementations, the encoder, or a component thereof, for encoding, or the decoder, or a component thereof, for decoding, may determine (at 1320) that global warped motion parameters associated with the current reference frame are unavailable and obtaining warped motion parameters based on the global warped motion parameters associated with the current reference frame 1300 may be otherwise omitted.

In response to identifying the global warped motion parameters associated with the current reference frame (at 1320), the encoder, or a component thereof, for encoding, or the decoder, or a component thereof, for decoding, determines that the global warped motion parameters associated with the current reference frame differ from the warped motion parameters in the warped reference list (at 1330), which includes determining whether the global warped motion parameters associated with the current reference frame differ from the warped motion parameters in the warped reference list. In some implementations, the encoder, or a component thereof, for encoding, or the decoder, or a component thereof, for decoding, may determine that the global warped motion parameters associated with the current reference frame match warped motion parameters in the warped reference list, and obtaining warped motion parameters based on the global warped motion parameters associated with the current reference frame 1300 may be otherwise omitted.

In response to determining that global warped motion parameters associated with the current reference frame differ from the warped motion parameters in the warped reference list (at 1330), the encoder, or a component thereof, for encoding, or the decoder, or a component thereof, for decoding, includes the global warped motion parameters associated with the current reference frame in the warped reference list (at 1340) at a sequentially minimal index location available in the warped reference list.

FIG. 14 is a flowchart diagram of an example of obtaining warped motion parameters based on defined warped motion parameters 1400 in accordance with implementations of this disclosure. Obtaining warped motion parameters based on the defined warped motion parameters 1400 may be implemented in an encoder, such as the encoder 400 shown in FIG. 4, or a decoder, such as the decoder 500 shown in FIG. 5.

Obtaining warped motion parameters based on the defined warped motion parameters 1400 includes determining that an index location is available in the warped reference list (at 1410), determining that unevaluated defined warped motion parameters are available (at 1420), determining that the defined warped motion parameters differ from the warped motion parameters in the warped reference list (at 1430), and including the defined warped motion parameters in the warped reference list (at 1440).

The encoder, or a component thereof, for encoding, or the decoder, or a component thereof, for decoding, determines that an, or at least one, index location is available, unpopulated, or empty, in the warped reference list (at 1410), which includes determining whether an index location is available, unpopulated, or empty, in the warped reference list, wherein the index location is the sequentially, such as in increasing warped reference list index value order, minimal, or earliest, available, unpopulated, or empty, index location. In some implementations, the encoder, or a component thereof, or the decoder, or a component thereof may determine that an index location is unavailable in the warped reference list, such as wherein the index locations of the warped reference list include respective warped motion parameters, and obtaining warped motion parameters based on the defined warped motion parameters 1400 may be otherwise omitted.

In response to determining that the index location is available, unpopulated, or empty, in the warped reference list (at 1410), the encoder, or a component thereof, for encoding, or the decoder, or a component thereof, for decoding, determines that unevaluated defined warped motion parameters are available (at 1420), which includes determining whether unevaluated defined warped motion parameters are available.

The encoder, or a component thereof, for encoding, or the decoder, or a component thereof, for decoding, includes, such as stores, defined warped motion parameters, or one or more sets of defined warped motion parameters, defined, and available to the encoder, the decoder, or both, prior to coding the current block, the current tile, the current frame, or the current video. In some implementations, the defined warped motion parameters, or one or more of the sets of defined warped motion parameters, may be defined, determined, generated, or otherwise obtained, by an offline training process. In some implementations, the defined warped motion parameters may include zero motion defined warped motion parameters, which may be expressed as ($h_{11}$=0, $h_{12}$=0, $h_{21}$=0, $h_{22}$=0, $h_{13}$=0, $h_{23}$=0).

The unevaluated defined warped motion parameters are defined warped motion parameters, or a defined warped motion parameter set, other than defined warped motion parameters, or a defined warped motion parameter set, previously evaluated in accordance with obtaining warped motion parameters based on defined warped motion parameters 1400 for the current block. Determining that the unevaluated defined warped motion parameters are available (at 1420) may include evaluating the defined warped motion parameters, or defined warped motion parameter sets, in a defined sequence, or order.

In some implementations, the encoder, or a component thereof, for encoding, or the decoder, or a component thereof, for decoding, may determine that unevaluated defined warped motion parameters are unavailable, such as wherein the defined warped motion parameters warped motion parameters were previously evaluated in accordance with obtaining warped motion parameters based on defined warped motion parameters 1400 for the current block, and obtaining warped motion parameters based on defined warped motion parameters 1400 may be otherwise omitted.

In response to determining that the unevaluated defined warped motion parameters are available (at 1420), the encoder, or a component thereof, for encoding, or the decoder, or a component thereof, for decoding, determines that the unevaluated defined warped motion parameters differ from the warped motion parameters in the warped reference list (at 1430), which includes determining whether the unevaluated defined warped motion parameters differ from the warped motion parameters in the warped reference list. In some implementations, the encoder, or a component thereof, for encoding, or the decoder, or a component thereof, for decoding, may determine that the unevaluated defined warped motion parameters match warped motion parameters in the warped reference list, and obtaining warped motion parameters based on defined warped motion parameters 1400 may be otherwise omitted. In some implementations, the encoder, or a component thereof, for encoding, or the decoder, or a component thereof, for decoding, may determine that the unevaluated defined warped motion parameters match warped motion parameters in the warped reference list, the unevaluated defined warped motion parameters may be identified as evaluated, and the encoder, or a component thereof, for encoding, or the decoder, or a component thereof, for decoding, may determine whether other unevaluated defined warped motion parameters are available (at 1420, as indicated by the directional line 1435).

In response to determining that the unevaluated defined warped motion parameters are available (at 1420), the encoder, or a component thereof, for encoding, or the decoder, or a component thereof, for decoding, includes the unevaluated defined warped motion parameters in the warped reference list (at 1440) at a sequentially minimal index location available in the warped reference list, which may include identifying the unevaluated defined warped motion parameters as evaluated.

Subsequent to including the defined warped motion parameters in the warped reference list (at 1440) obtaining warped motion parameters based on the defined warped motion parameters 1400 may be repeated or iterated (as indicated by the directional line at 1445).

Figure 15:
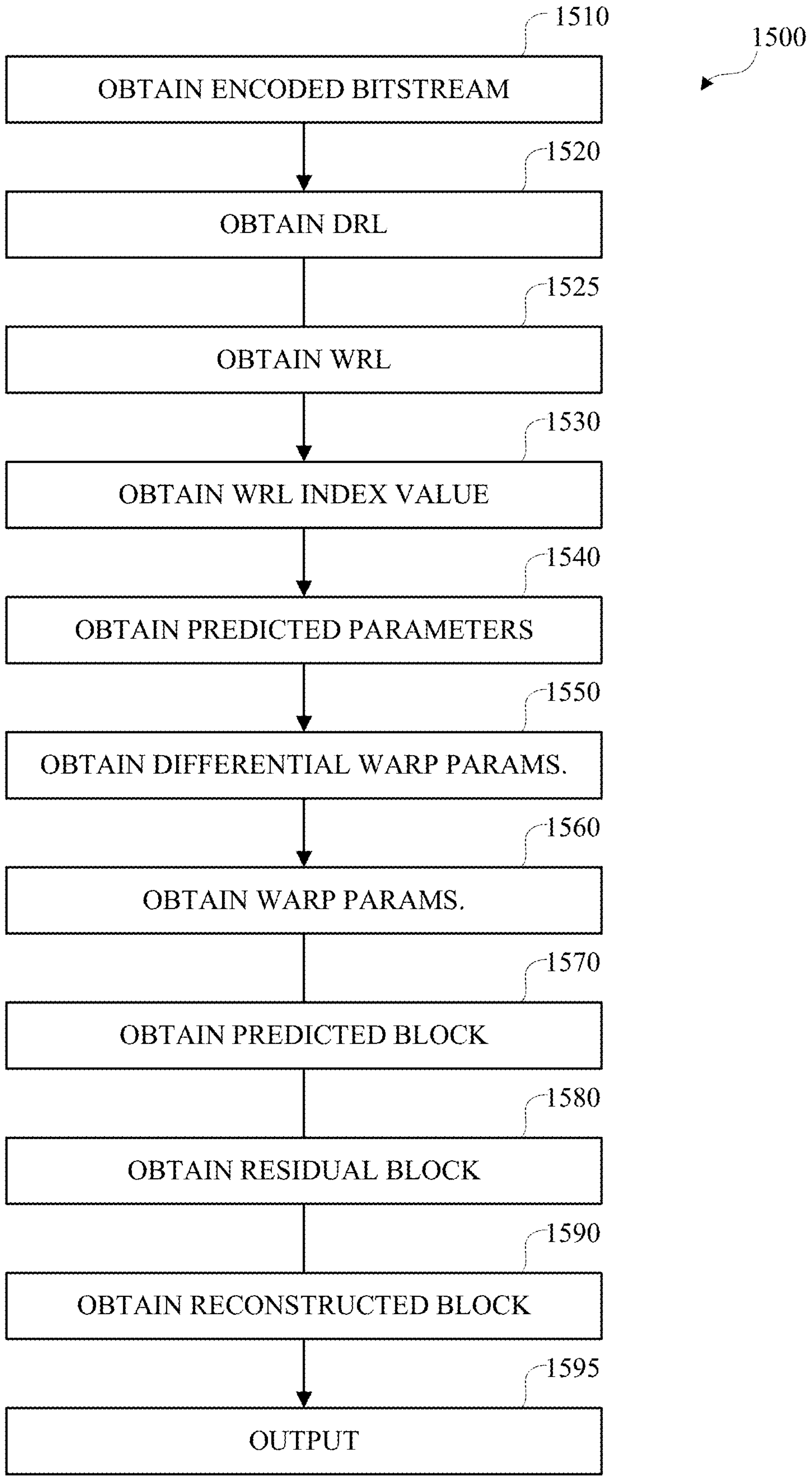
FIG. 15 is a flowchart diagram of an example of decoding using warped reference list for warped motion video coding in accordance with implementations of this disclosure.

FIG. 15 is a flowchart diagram of an example of decoding using warped reference list for warped motion video coding 1500 in accordance with implementations of this disclosure. Decoding using warped reference list for warped motion video coding 1500 may be implemented in a decoder, such as the decoder 500 shown in FIG. 5.

Decoding using warped reference list for warped motion video coding 1500 includes decoding an encoded bitstream, such as the compressed bitstream 502 shown in FIG. 5, or one or more portions thereof, to generate a reconstructed video, or a portion thereof, such as the output video stream 504 shown in FIG. 5.

The decoder may maintain, such as store in local memory, such as in a decoded frame buffer (or reference frame buffer, or reconstructed frame buffer), one or more reconstructed frames, which may be used reference frames for inter prediction, which is similar to the reconstructed frame buffer maintained by the encoder as described with reference to FIG. 7, except as is described herein or as is otherwise clear from context.

Decoding using warped reference list for warped motion video coding 1500 includes obtaining the encoded bitstream (at 1510), obtaining a translational dynamic reference list (at 1520), obtaining a warped reference list (at 1525), obtaining a warped reference list index value (at 1530), obtaining predicted warped motion parameters (at 1540), obtaining differential warped model parameters (at 1550), obtaining current warped model parameters (at 1560), obtaining a predicted block (at 1570), obtaining a residual block (at 1580), obtaining a reconstructed block (at 1590), and outputting the reconstructed block (at 1595).

The encoded bitstream is obtained (at 1510). Obtaining the encoded bitstream includes identifying a current frame to decode from the encoded bitstream to generate a current reconstructed frame, which includes identifying a current block from the current frame to decode from the encoded bitstream to generate a current reconstructed block to include in the current reconstructed frame. For example, the decoder, or a component thereof, such as an intra/inter prediction unit of the decoder, such as the entropy decoding unit 510 shown in FIG. 5, may obtain the input video stream. The current frame may be obtained (at 1510) subsequent to decoding one or more other frames, such as a frame sequentially preceding the current frame, and generating, or otherwise obtaining, a corresponding reconstructed frame (or frames), or one or more portions thereof, for use as a reference frame (or frames) for decoding the current frame. Although not shown separately in FIG. 15, decoding using warped reference list for warped motion video coding 1500 may include decoding, reconstructing, or both, one or more portions of the current frame prior to decoding, reconstructing, or both, the current block.

The translational dynamic reference list is obtained, determine, or generated (at 1520). Obtaining the translational dynamic reference list (at 1520) is similar to generating the translational dynamic reference list as shown (at 720) in FIG. 7, except as is described herein or as is otherwise clear from context.

Although not shown separately in FIG. 15, decoding using warped reference list for warped motion video coding 1500 includes determining whether to decode the current block using a translational motion mode, in accordance with translational motion vectors, or using a warped motion mode, in accordance with warped motion parameters. For example, the decoder, of a component thereof, may decode a bit, a flag, or a symbol, indicating to decode the current block using a warped motion mode, in accordance with warped motion parameters.

The warped reference list is obtained (at 1525). Obtaining the warped reference list (at 1525) is similar to obtaining a warped reference list as shown (at 730) in FIG. 7, except as is described herein or as is otherwise clear from context. An example of obtaining the warped reference list is shown in FIG. 8.

A warped reference list index value is obtained (at 1530). Obtaining the warped reference list index value (at 1530) includes decoding, reading, extracting, or otherwise accessing, the warped reference list index value from the encoded bitstream for the current block. The warped reference list index value indicating optimal predicted warped model parameters.

Predicted warped motion parameters are, or a set of predicted warped motion parameters is, obtained (at 1540). Obtaining the predicted warped motion parameters, which may be optimal predicted warped motion parameters, includes obtaining the predicted warped motion parameters from the warped reference list in accordance with the warped reference list index value.

Differential warped model parameters are obtained (at 1550) by decoding, reading, extracting, or otherwise accessing, the differential warped model parameters (encoded data indicating differential warped model parameters) from the encoded bitstream.

Current warped model parameters are obtained (at 1560). Obtaining the current warped model parameters (h) includes combining, or adding, the predicted warped motion parameters (h') and the differential warped model parameters (Δh), wherein obtaining a current warped model parameter ($h_{mn}$) includes combining, or adding, the corresponding predicted warped motion parameter ($h'_{mn}$) and the corresponding differential warped model parameter ($\Delta h_{mn}$), wherein $1 \le m, n \le 2$ for a six-parameter affine warped motion model or $1 \le m \le 2$, $n=1$ for a four-parameter similarity warped motion model, which may be expressed as the following:

$$h_{mn} = \Delta h_{mn} + h'_{mn}. \quad \text{[Equation 6]}$$

In some implementations, the differential warped model parameters may be omitted, or absent, from the encoded bitstream, and, in response to determining that the differential warped model parameters are omitted, or absent (absence), from the encoded bitstream, the predicted warped model parameters may be used as the current, optimal, warped model parameters.

The translational parameters ($h_{13}$, $h_{23}$) of the current warped model parameters (h) may be obtained by decoding, reading, extracting, or otherwise accessing, a translational motion vector for the current block from the encoded bitstream.

A predicted block is obtained (at 1570) in accordance with the current warped model parameters (h) and a corresponding reference frame.

A residual block is obtained (at 1580) by decoding, reading, extracting, or otherwise accessing, the residual block (encoded data indicating residual block data) from the encoded bitstream.

A reconstructed block is obtained (at 1590) by combining, or adding, the predicted block and the residual block.

The reconstructed block is output (at 1595), such as by including the reconstructed block in the reconstructed frame and including the reconstructed frame in the output.

In some implementations, the differential warped model parameters may be conditionally signaled. For example, the differential warped model parameters may be decoded, read, extracted, or otherwise accessed, from the encoded bitstream in response to a determination that the warped reference list index value (warp_ref_idx) is less than a defined threshold, such as one (warp_ref_idx<1).

In some implementations, a bit, flag, or symbol, may be decoded, read, extracted, or otherwise accessed, from the encoded bitstream for the current block, indicating whether the warped motion model is a four-parameter similarity warped motion model (a four-parameter warped motion model) or a six-parameter affine warped motion model (a six-parameter warped motion model).

In some implementations, the defined, or determined, size, or cardinality, (N) of the warped reference list may be identified in accordance with a prediction mode for the current block. For example, the prediction mode for the current block may be a new motion vector prediction mode (new motion vector mode), and the defined, or determined, size, or cardinality (maximum cardinality), (N) of the warped reference list may be four (N=4). In another example, the prediction mode for the current block may be other than the new motion vector prediction mode, and the defined, or determined, size, or cardinality (N) of the warped reference list may be one (N=1).

In some implementations, the defined, or determined, size, or cardinality (N) of the warped reference list may be obtained, decoded, read, extracted, or otherwise accessed, from the encoded bitstream (encoded data). The defined, or determined, size, or cardinality (N) of the warped reference list may be signaled, such as included in the encoded bitstream, for a portion of the video stream, such as for the current frame, for the current video sequence (current sequence of frames), or for another portion of the video stream. In some implementations, the defined, or determined, size, or cardinality (N) of the warped reference list may be defined, or determined, prior to coding the current block, the current tile, the current frame, or the current video and decoding the defined, or determined, size, or cardinality (N) of the warped reference list may be omitted.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. An apparatus comprising:
- a memory including computer executable instructions for encoding an input video; and
- a processor that executes the computer executable instructions to:
  - generate a translational dynamic reference list for encoding a current block from a current frame from the input video;
  - generate a warped reference list for encoding the current block;
  - generate an output bitstream including:
    - an index value corresponding to optimal predicted warped model parameters from the warped reference list,
    - encoded block data, wherein, to obtain the encoded block data the processor executes the computer executable instructions to encode the current block in accordance with optimal warped model parameters, and
    - differential warped model parameters, wherein the differential warped model parameters indicate a difference between the optimal warped model parameters and the optimal predicted warped model parameters; and
  - output the output bitstream.

2. The apparatus of claim 1, wherein, to obtain the warped reference list, the processor executes the computer executable instructions to:
- identify a translational motion vector prediction block corresponding to a translational motion vector for the current block;
- in response to a determination that the translational motion vector prediction block corresponds to a context block previously encoded using warped motion prediction, include warped motion parameters from the context block in the warped reference list at a sequentially minimal index location available in the warped reference list;
- in response to a determination that:
  - at least one index location is available in the warped reference list,
  - a sequentially minimal unevaluated context block previously encoded using warped motion prediction with reference to a current reference frame indicated by a current reference frame index, wherein, to encode the current block, the processor executes the computer executable instructions to encode the current block with reference to the current reference frame, is available among a defined sequence of context blocks, and
  - warped motion parameters from the sequentially minimal unevaluated context block differ from warped motion parameters in the warped reference list,
- include warped motion parameters from the sequentially minimal unevaluated context block in the warped reference list at a sequentially minimal index location available in the warped reference list;
- in response to a determination that:
  - at least one index location is available in the warped reference list, and
  - warped motion parameters that differ from the warped motion parameters in the warped reference list are available from a warped motion parameter bank for a current tile, wherein the current tile includes the current block,
- include the warped motion parameters from the warped motion parameter bank in the warped reference list at a sequentially minimal index location available in the warped reference list;
- in response to a determination that at least one index location is available in the warped reference list, include global warped motion parameters associated with the current reference frame that differ from the warped motion parameters in the warped reference list in the warped reference list at a sequentially minimal index location available in the warped reference list; and
- in response to a determination that at least one index location is available in the warped reference list, include defined warped motion parameters in the warped reference list at a sequentially minimal index location available in the warped reference list.

3. The apparatus of claim 1, wherein, to obtain the output bitstream, the processor executes the computer executable instructions to:
- determine whether to omit the differential warped model parameters from the output bitstream; and
- in response to a determination to omit the differential warped model parameters from the output bitstream, omit the differential warped model parameters from the output bitstream.

4. The apparatus of claim 3, wherein, to determine whether to omit the differential warped model parameters from the output bitstream, the processor executes the computer executable instructions to:
- in response to a determination that the index value is greater than or equal to a defined threshold, determine to omit the differential warped model parameters from the output bitstream.

5. The apparatus of claim 1, wherein:
- a current pixel from the current block has a current horizontal position in the current frame and a current vertical position in the current frame;
- the optimal predicted warped model parameters include:
  - a horizontal translational motion parameter;
  - a vertical translational motion parameter;
  - a horizontal scaling parameter;
  - a vertical scaling parameter;
  - a first rotation parameter; and
  - a second rotation parameter;
- a horizontal displacement for encoding the current block is a sum of:
  - a result of multiplication of the horizontal scaling parameter by the current horizontal position, a result of multiplication of the first rotation parameter by the current vertical position, and the horizontal translational motion parameter; and a vertical displacement for encoding the current block is a result of adding:

a result of multiplication the vertical scaling parameter by the current horizontal position, a result of multiplication the second rotation parameter by the current vertical position, and the vertical translational motion parameter.

6. The apparatus of claim 5, wherein, to obtain the output bitstream, the processor executes the computer executable instructions to:

include, in the output bitstream, a flag indicating that the current block is encoded using a six-parameter warped motion model.

7. The apparatus of claim 1, wherein:

a current pixel from the current block has a current horizontal position in the current frame and a current vertical position in the current frame;

the optimal predicted warped model parameters include:

a horizontal translational motion parameter;

a vertical translational motion parameter;

a horizontal scaling parameter; and a rotation parameter;

a horizontal displacement for encoding the current block is a result of:

adding:

a result of subtracting:

a result of multiplying the rotation parameter by the current vertical position, from a result of multiplying the horizontal scaling parameter by the current horizontal position, and the horizontal translational motion parameter; and a vertical displacement for encoding the current block is a result of adding:

a result of multiplying the rotation parameter by the current horizontal position, a result of multiplying the horizontal scaling parameter by the current vertical position, and the vertical translational motion parameter.

8. The apparatus of claim 7, wherein, to obtain the output bitstream, the processor executes the computer executable instructions to:

include, in the output bitstream, a flag indicating that the current block is encoded using a four-parameter warped motion model.

9. The apparatus of claim 1, wherein, to obtain the warped reference list, the processor executes the computer executable instructions to:

determine a maximum cardinality of the warped reference list in accordance with a prediction mode for encoding the current block.

10. The apparatus of claim 9, wherein:

in response to a determination that the prediction mode is new motion vector mode, the maximum cardinality is four; and in response to a determination that the prediction mode is other than the new motion vector mode, the maximum cardinality is one.

11. The apparatus of claim 1, wherein, to obtain the output bitstream, the processor executes the computer executable instructions to:

include, in the output bitstream, a maximum cardinality of the warped reference list for the current frame.

12. The apparatus of claim 1, wherein:

the input video includes a current sequence of frames that includes the current frame; and to obtain the output bitstream the processor executes the computer executable instructions to:

include, in the output bitstream, a maximum cardinality of the warped reference list for the current sequence of frames.

13. A non-transitory computer-readable storage medium, having stored thereon an encoded bitstream comprising:

encoded data indicating a warped reference list index value indicating optimal predicted warped model parameters from a warped reference list for decoding a current block for generating a reconstructed frame corresponding to a current frame of a current sequence of frames;

encoded data indicating differential warped model parameters for the current block, wherein the differential warped model parameters indicate a difference between the optimal predicted warped model parameters and optimal warped model parameters used to generate predicted block data for the current block; and encoded data indicating residual block data for the current block, wherein processing the encoded bitstream causes a processor executing decoding instructions to generate a sum of the residual block data and the predicted block data as decoded block data for the current block.

14. The non-transitory computer-readable storage medium of claim 13, wherein the encoded bitstream includes:

encoded data indicating a flag indicating that the current block is encoded using a six-parameter warped motion model.

15. The non-transitory computer-readable storage medium of claim 13, wherein the encoded bitstream includes:

encoded data indicating a flag indicating that the current block is encoded using a four-parameter warped motion model.

16. The non-transitory computer-readable storage medium of claim 13, wherein the encoded bitstream includes:

encoded data indicating a maximum cardinality of the warped reference list for the current frame.

17. The non-transitory computer-readable storage medium of claim 13, wherein the encoded bitstream includes:

encoded data indicating a maximum cardinality of the warped reference list for the current sequence of frames.

18. A non-transitory computer-readable storage medium, having stored thereon an encoded bitstream comprising:

encoded data indicating a warped reference list index value indicating optimal predicted warped model parameters from a warped reference list for decoding a current block for generating a reconstructed frame corresponding to a current frame of a current sequence of frames; and encoded data indicating residual block data for the current block, wherein processing the encoded bitstream causes a processor to execute decoding instructions to generate a sum of the residual block data and predicted block data for the current block as decoded block data for the current block, wherein:

encoded data indicating differential warped model parameters for the current block is absent from the encoded bitstream, wherein the differential warped model parameters indicate a difference between the optimal predicted warped model parameters and optimal warped model parameters used to generate the predicted block data for the current block, wherein an absence of the encoded data indicating the differential warped model parameters indicates that the warped reference list index value is greater than or equal to a defined threshold.

19. The non-transitory computer-readable storage medium of claim 18, wherein the encoded bitstream includes:

encoded data indicating a flag indicating that the current block is encoded using a six-parameter warped motion model; or encoded data indicating a flag indicating that the current block is encoded using a four-parameter warped motion model.

20. The non-transitory computer-readable storage medium of claim 13, wherein the encoded bitstream includes one or more of:

encoded data indicating a maximum cardinality of the warped reference list for the current frame; and encoded data indicating a maximum cardinality of the warped reference list for the current sequence of frames.

* * * * *